(12) United States Patent
Okada et al.

(10) Patent No.: US 8,270,813 B2
(45) Date of Patent: Sep. 18, 2012

(54) APPARATUS, METHOD AND COMPUTER PROGRAM FOR PROCESSING INFORMATION

(75) Inventors: Shunji Okada, Kanagawa (JP); Ryogo Ito, Tokyo (JP)

(73) Assignee: Sony Corporation (JP)

( * ) Notice: Subject to any disclaimer, the term of this patent is extended or adjusted under 35 U.S.C. 154(b) by 1418 days.

(21) Appl. No.: 11/897,943

(22) Filed: Aug. 31, 2007

(65) Prior Publication Data

US 2008/0069522 A1     Mar. 20, 2008

(30) Foreign Application Priority Data

Sep. 4, 2006   (JP) ............................... P2006-238918

(51) Int. Cl.
*H04N 5/94* (2006.01)
*H04N 9/80* (2006.01)
(52) U.S. Cl. .................... 386/277; 386/239; 386/263
(58) Field of Classification Search .................. None
See application file for complete search history.

(56) References Cited

U.S. PATENT DOCUMENTS

| | | | | |
|---|---|---|---|---|
| 5,983,240 | A * | 11/1999 | Shoroff et al. ........................ 1/1 |
| 2004/0039575 | A1 * | 2/2004 | Bum ............. 704/500 |
| 2005/0152679 | A1 | 7/2005 | Matsuno et al. |
| 2007/0182846 | A1 * | 8/2007 | Uchida et al. ................. 348/376 |

FOREIGN PATENT DOCUMENTS

| | | |
|---|---|---|
| JP | 9-101912 A | 4/1997 |
| JP | 11-096685 A | 4/1999 |
| JP | 11-242563 A | 9/1999 |
| JP | 2004-071130 A | 3/2004 |
| JP | 2004-078461 A | 3/2004 |
| JP | 2004-213706 A | 7/2004 |

* cited by examiner

*Primary Examiner* — William C Vaughn, Jr.
*Assistant Examiner* — Heather Jones
(74) *Attorney, Agent, or Firm* — Lerner, David, Littenberg, Krumholz & Mentlik, LLP

(57) ABSTRACT

An information processing apparatus for recording data in a file by first unit on a recording medium in accordance with a predetermined file system, which may include a recording control unit performing a recording control operation to record a predetermined file on the recording medium, the recording control operation including data recording control for recording successively the data on the recording medium by first unit and management information updating control for updating management information of the predetermined file system on the recording medium, a generating unit successively generating difference information of the management information by second unit during the recording control operation of the recording control unit, the second unit being an integer multiple of the least common multiple of the first unit and a minimum unit of the predetermined file system, and a backup storage unit storing as backup information the difference information generated by the generating unit.

10 Claims, 21 Drawing Sheets

APPARATUS, METHOD AND COMPUTER PROGRAM FOR PROCESSING INFORMATION

CROSS-REFERENCE TO RELATED APPLICATIONS

This application claims priority from Japanese Patent Application No. JP 2006-238918 filed in the Japanese Patent Office on Sep. 4, 2006, the entire content of which is incorporated herein by reference.

BACKGROUND OF THE INVENTION

1. Field of the Invention

The present invention relates to an information processing apparatus, information processing method and computer program for processing information. In particular, the present invention relates to an information processing apparatus, information processing method, and computer program for restoring appropriately a file system that has been destroyed due to power interruptions or any other power failures.

2. Description of the Related Art

Known video cameras record a file system (FS) in a file allocation table (FAT) format during recording of a moving image. Also, during moving image taking operation, the known video cameras write a file body by a predetermined number of groups of pictures (GOPs), namely, a recording unit of video recording (RUV) as a unit in accordance with moving picture experts group (MPEG) or MPEG 4/advanced video coding (AVC). The length of a moving image file is updated by RUV. If a power interruption takes place during moving image taking operation, the file body is backed up by RUV unit, a file length to the point of time of power interruption is calculated, and the FS is updated and restored (as disclosed in Japanese Unexamined Patent Application Publication No. 11-242563).

SUMMARY OF THE INVENTION

If the FS for writing management data to be restored as a file is destroyed, means and method of restoration are also lost. Power interruption can occur at any moment. Power interruption can occur in the middle of updating the FS. If the FS is destroyed due to power interruption, not only moving image data recorded around the power interruption point but also access means for accessing all photograph files accumulated in the past may be lost.

If FAT 1 is destroyed during the updating of the FS and cannot be read any more, FAT2 that is a copy of the FAT 1 is read. If power is interrupted during FS updating, and if the FAT1 and the FAT2 are different from each other, the reading and copying of FAT2 instead of the FAT1 does not work. If power is interrupted during the writing of the FAT2, the FAT2 may be destroyed. If a destroyed FAT2 is used during restoration, the FS may also be destroyed. A normally updated FAT1 cannot be used as is because the directory thereof remains unupdated.

If the FS is destroyed due to a power failure during recording, restoration of the FS is extremely difficult. The same is true of other FS in a format other than the FAT.

It is thus desirable to restore the FS that has been destroyed due to a power interruption during updating operation of the FS.

In accordance with one embodiment of the present invention, an information processing apparatus for recording data in a file by first unit on a recording medium in accordance with a predetermined file system, may include a recording controller for performing a recording control operation to record a predetermined file on the recording medium, the recording control operation including data recording control for recording successively the data on the recording medium by first unit and management information updating control for updating management information of the predetermined file system on the recording medium, a generator for successively generating difference information of the management information by second unit during the recording control operation of the recording controller, the second unit being an integer multiple of the least common multiple of the first unit and a minimum unit of the predetermined file system, and a backup storage for storing as backup information the difference information generated by the generator.

The generator may generate a first mark indicting that the data recording control is in progress and store the first mark on the backup storage, and generate a second mark indicating that the management information updating control is in progress and store the second mark on the backup storage.

The recording controller may identify a timing at which the data recording control has ended in abnormal termination, based on the presence or absence of each of the first mark and the second mark on the backup storage.

The recording controller may determine that the management information updating control has ended in abnormal termination if the second mark is stored on the backup storage means, and perform management information restoration control for restoring the management information of the predetermined file system on the recording medium, using the difference information stored on the backup storage.

The predetermined file system may include a file allocation table (FAT) file system, and the management information of the predetermined file system may include FAT1, FAT2 and a directory entry.

The recording controller may concurrently restore the FAT1, the FAT2 and the directory entry in the management information restoration control.

The predetermined file system may include a file allocation table (FAT) file system, and the management information of the predetermined file system may include FAT1, FAT2 and a directory entry. The recording controller may update the FAT1, the FAT2, and the directory entry in that order in the management information updating control. As the second marks the generator may generate a second mark zero indicating that the updating of the FAT1 is in progress and store the second mark zero on the backup storage, generate a second mark one indicating that the updating of the FAT2 is in progress and store the second mark one on the backup storage, and generate a second mark two indicating that the updating of the directory entry is in progress and store the second mark two on the backup storage. In the management information restoration control the recording controller may restore the FAT1, the FAT2 and the directory entry if the second mark zero is stored on the backup storage, restore the FAT2 and the directory entry if the second mark one is stored on the backup storage, and restore the directory entry if the second mark two is stored on the backup storage.

In accordance with one embodiment of the present invention, an information processing method for recording data in a file by first unit on a recording medium in accordance with a predetermined file system, may include performing a recording control operation to record a predetermined file on the recording medium, the recording control operation including data recording control for recording successively the data on the recording medium by first unit and management information updating control for updating management information of the predetermined file system on the recording medium, successively generating difference information of the management information by second unit during the recording control operation, the second unit being an integer multiple of the least common multiple of the first unit and a minimum unit of the predetermined file system, and storing as backup information the difference information on a storage different from the recording medium.

In accordance with one embodiment of the present invention, a program for causing a computer to record data in a file by first unit on a recording medium in accordance with a predetermined file system, may include the same steps as the above-described information processing method.

In accordance with embodiments of the present invention, the recording control operation for recording the data in a file by the first unit on the recording medium in accordance with a predetermined file system may be performed. The recording control operation may include the data recording control for recording successively data on the recording medium by first unit and the management information updating control for updating the management information of the predetermined file system on the recording medium. During the recording control operation, the difference information of the management information may be successively generated by second unit, the second unit being an integer multiple of the least common multiple of the first unit and the minimum unit of the predetermined file system. The difference information may be stored as backup information on the storage different from the recording medium, for example, a backup storage in the information processing apparatus.

In accordance with embodiments of the present invention, the recording control may be performed using the file system. Even if the file system is destroyed due to a power interruption during recording, the file system may be appropriately restored.

DETAILED DESCRIPTION

Before describing an embodiment of the present invention, the correspondence between the features of the present invention and an embodiment disclosed in the specification or the drawings of the invention is discussed below. This statement is intended to assure that embodiments supporting the claimed invention are described in this specification or the drawings. Thus, even if an embodiment is described in the specification or the drawings, but not described as relating to a feature of the invention herein, that does not necessarily mean that the embodiment does not relate to that feature of the invention. Conversely, even if an embodiment is described herein as relating to a certain feature of the invention, that does not necessarily mean that the embodiment does not relate to other features of the invention.

Figure 1:
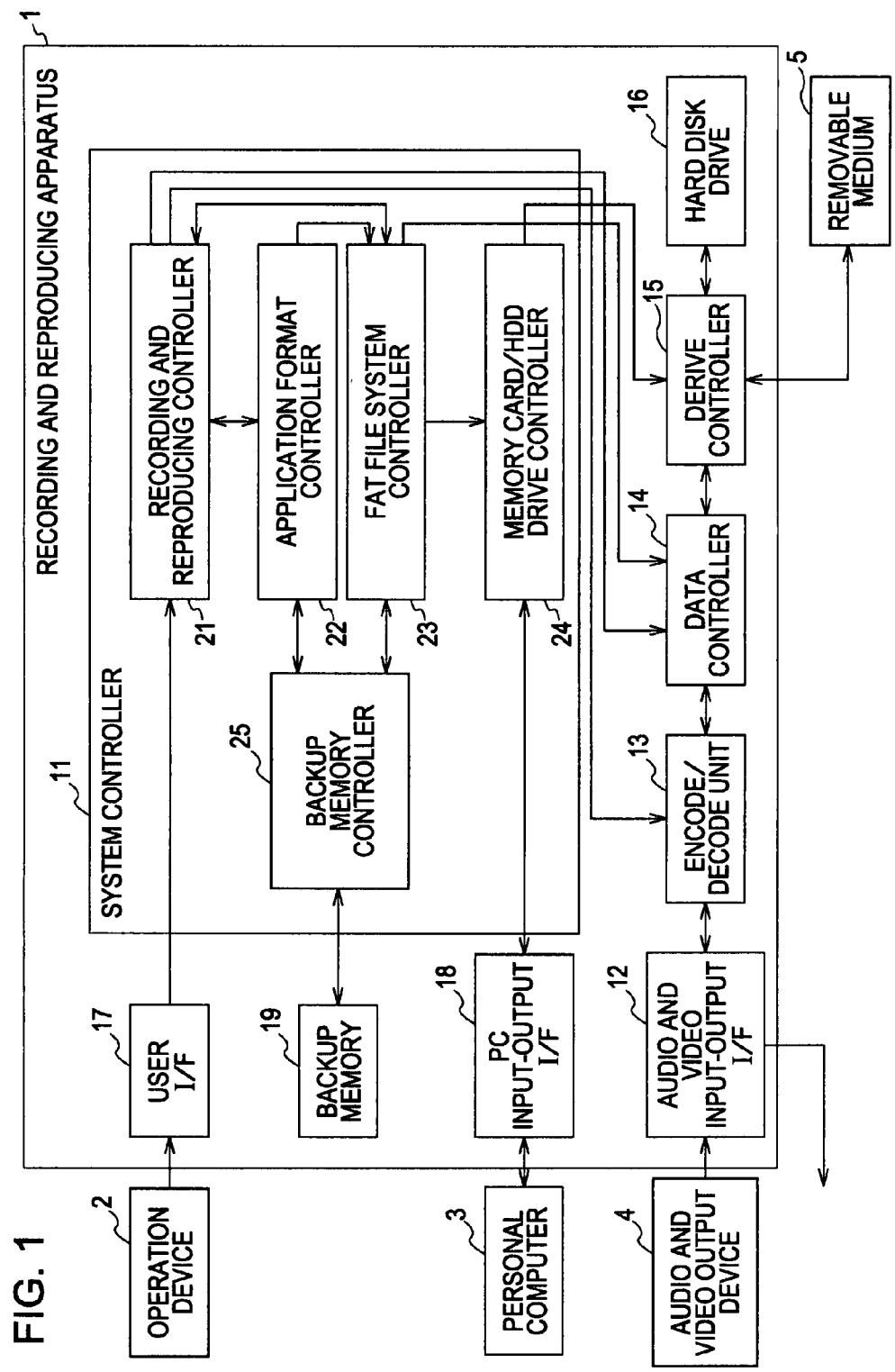
FIG. 1 is a functional block diagram of a recording and reproducing apparatus as an information processing apparatus in accordance with one embodiment of the present invention.
Figure 2:
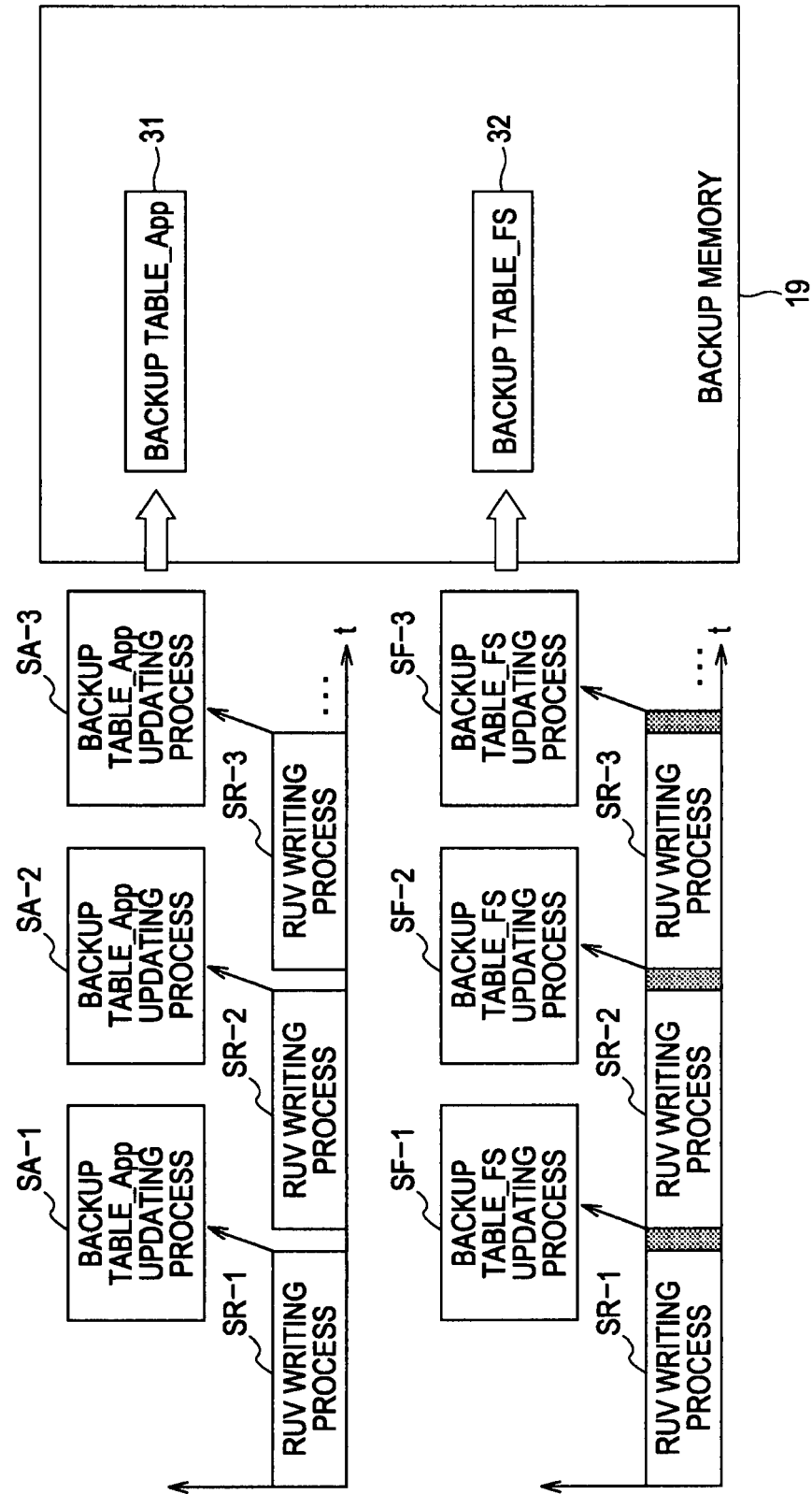
FIG. 2 illustrates an example of control process of a backup memory controller of FIG. 1.
Figure 6:
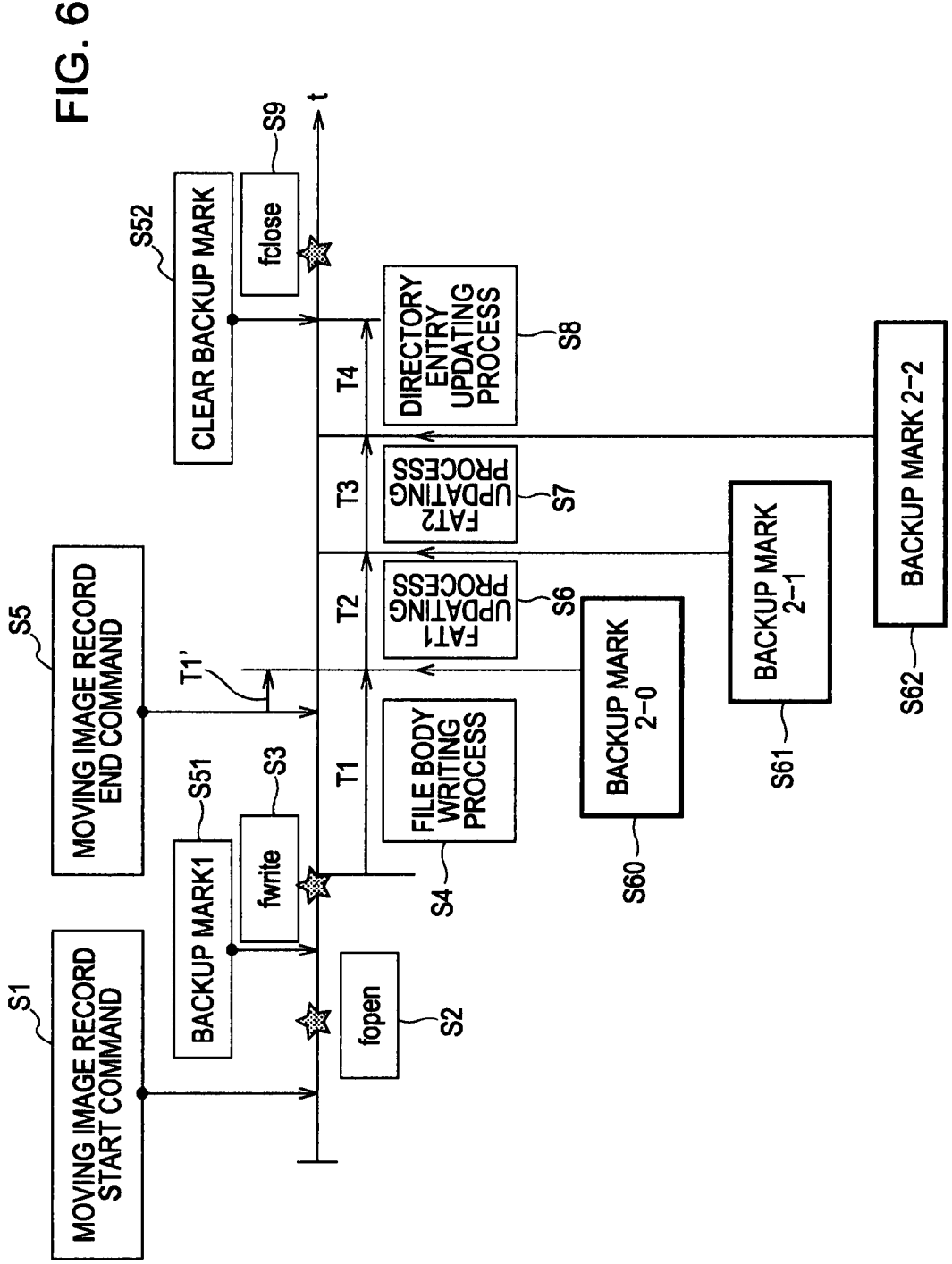
FIG. 6 is a flowchart illustrating a recording process in accordance with one embodiment of the present invention.
Figure 8:
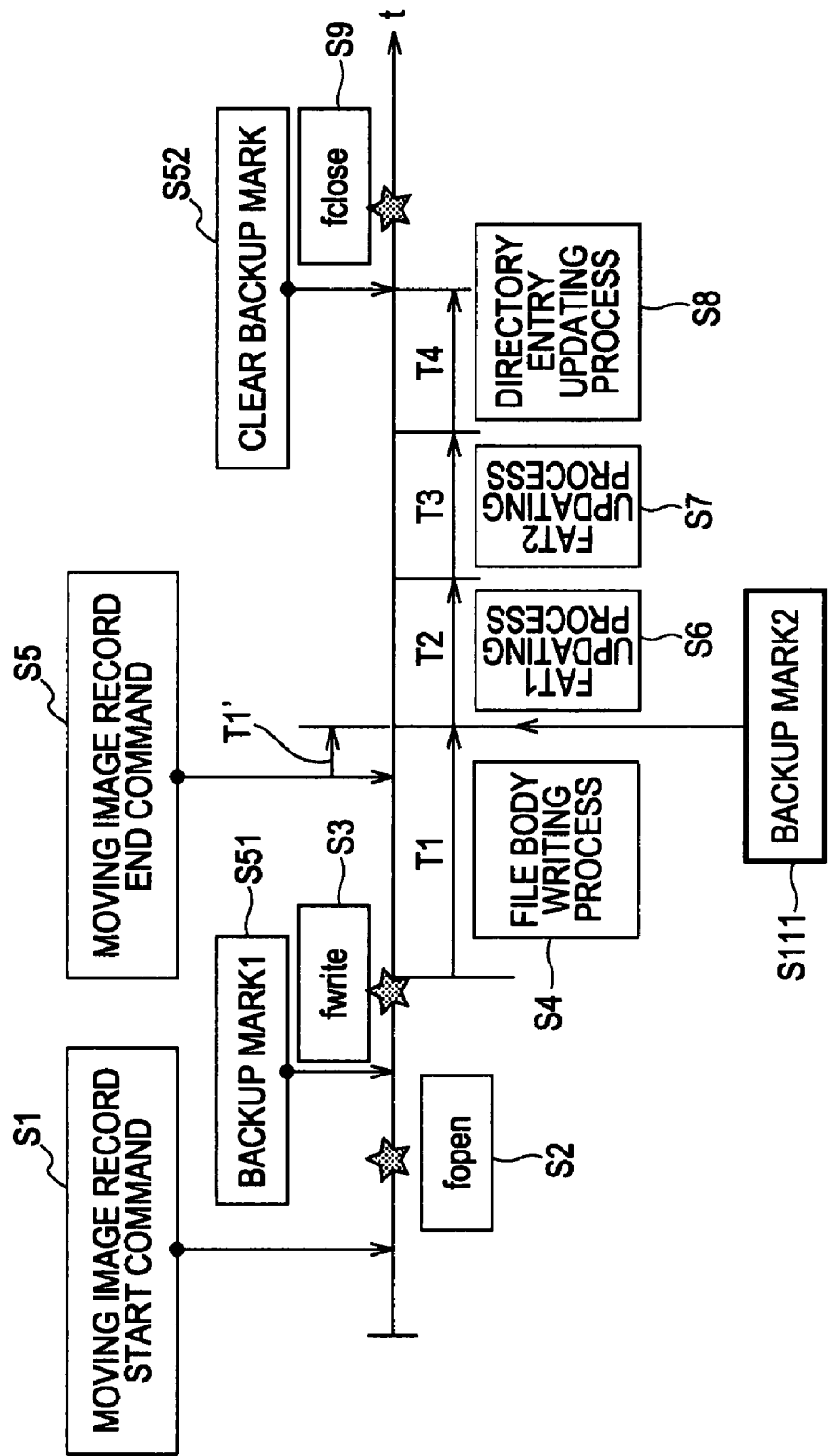
FIG. 8 is a flowchart illustrating a recording process in accordance with one embodiment of the present invention, different from the recording process of FIG. 6.

In accordance with one embodiment of the present invention, an information processing apparatus (for example, recording and reproducing apparatus 1 of FIG. 1) for recording data in a file by first unit on a recording medium (for example, hard disk 41 of FIG. 3 in the hard disk drive 16 of FIG. 1) in accordance with a predetermined file system, includes a recording controller (for example, system controller 11 excluding backup memory controller 25 of FIG. 1) for performing a recording control operation to record a predetermined file on the recording medium, the recording control operation including data recording control (for example, control process of writing a file body in step S4 of FIG. 6 and FIG. 8) for recording successively the data on the recording medium by first unit and management information updating control (for example, updating process of FAT1 in step S6, updating process of FAT2 in step S7, and updating process of directory entry in step S8 as shown in FIGS. 6 and 8) for updating management information of the predetermined file system on the recording medium, a generator (for example, backup memory controller 25 of FIG. 1) for successively generating difference information of the management information by second unit during the recording control operation of the recording controller (for example, executing backup table FS updating processes SF-1 through SF-3 at RUV writing processes SR-1 through SR-3 of FIG. 2), the second unit being an integer multiple of the least common multiple of the first unit and a minimum unit of the predetermined file system, and a backup storage (for example, backup memory 19 of FIGS. 1 and 2) for storing as backup information the difference information generated by the generator.

The generator may generate a first mark (for example, backup mark 1 of FIGS. 6 and 8) indicting that the data recording control is in progress and store the first mark on the backup storage, and generate a second mark (for example, backup marks 2-0, 2-1 and 2-2 of FIG. 6 and backup mark 2 of FIG. 8) indicating that the management information updating control is in progress and store the second mark on the backup storage.

Figure 7:
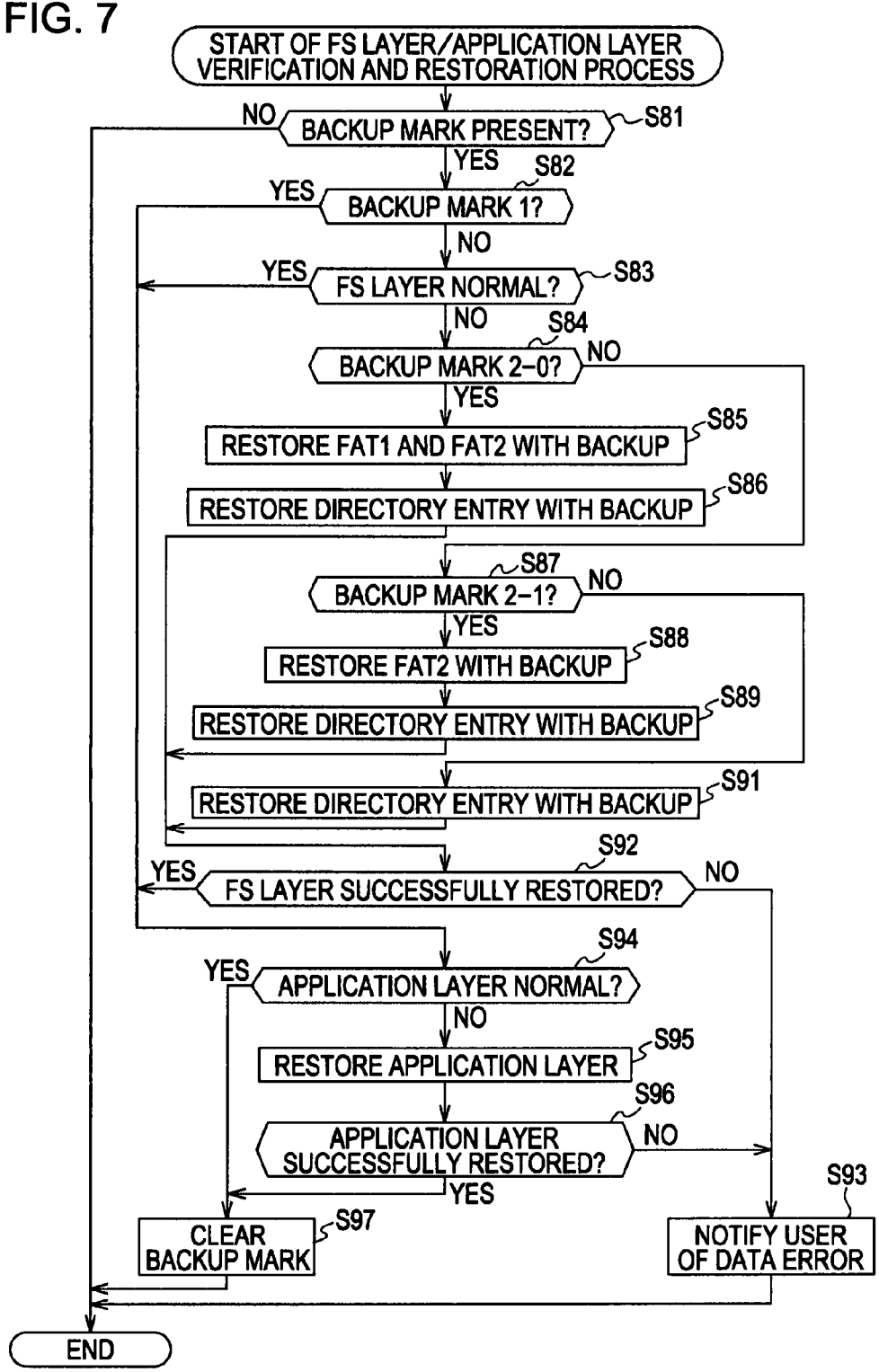
FIG. 7 is a flowchart illustrating an FS layer/application layer verification and restoration process in accordance with one embodiment of the present invention, performed in step with the recording process of FIG. 6.
Figure 9:
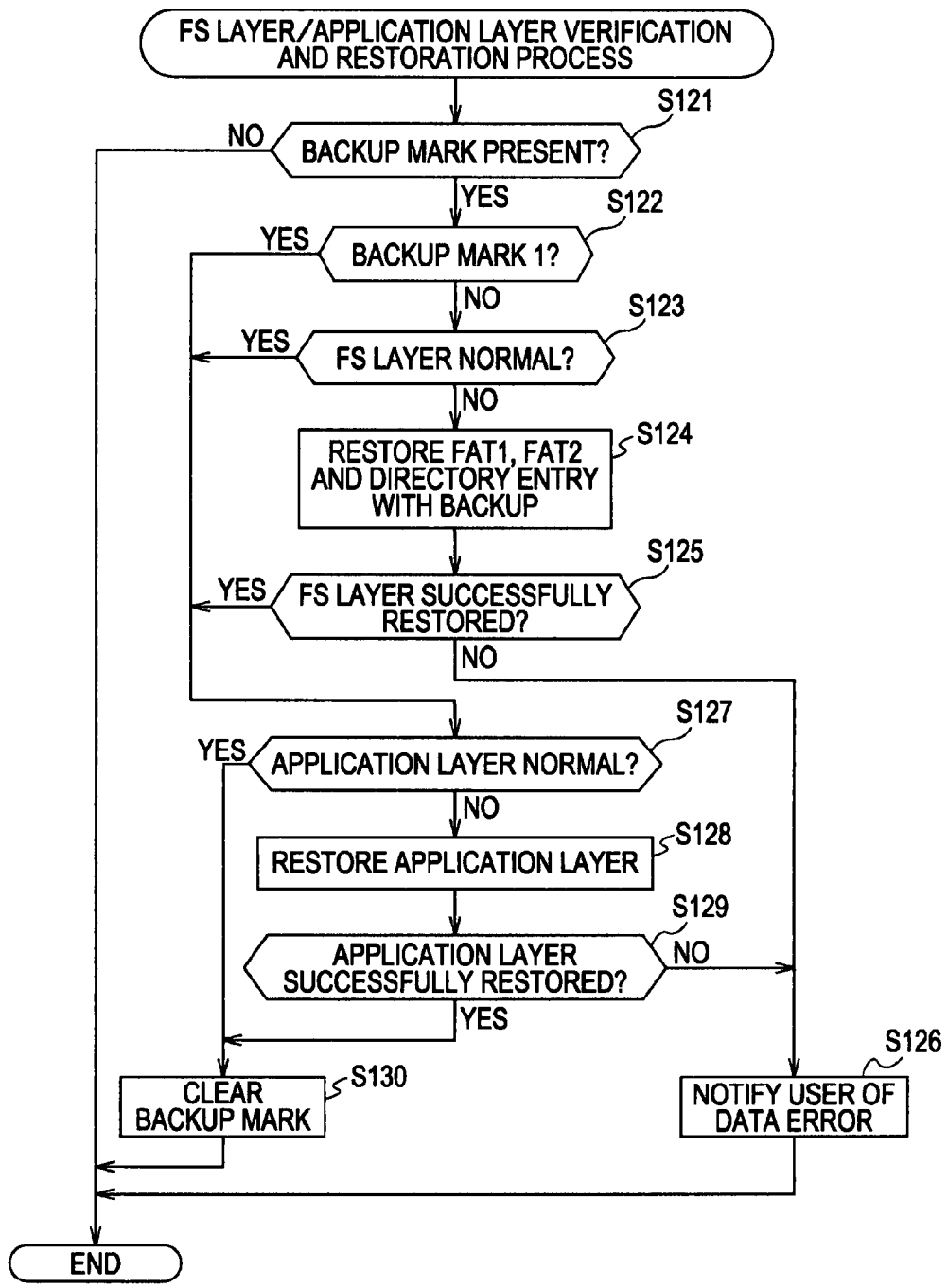
FIG. 9 is a flowchart illustrating a FS layer/application layer verification and restoration process in accordance with one embodiment of the present invention, performed in step with the recording process of FIG. 8.

The recording controller may identify a timing at which the data recording control has ended in abnormal termination, based on the presence or absence of each of the first mark and the second mark on the backup storage (in steps S82, S84 and S87 of FIG. 7 or step S122 of FIG. 9).

The recording controller may determine that the management information updating control has ended in abnormal termination if the second mark is stored on the backup storage means, and perform management information restoration control for restoring the management information of the predetermined file system on the recording medium, using the difference information stored on the backup storage (for example, in steps S85, S86, S88, S89 and S91 of FIG. 7 or S124 of FIG. 9).

The predetermined file system may include a file allocation table (FAT) file system, and the management information of the predetermined file system may include FAT1, FAT2 and a directory entry.

The recording controller may concurrently restore the FAT1, the FAT2 and the directory entry in the management information restoration control (for example, in step S124 of FIG. 9).

The predetermined file system may include a file allocation table (FAT) file system, and the management information of the predetermined file system may include FAT1, FAT2 and a directory entry. The recording controller may update the FAT1, the FAT2, and the directory entry in that order in the management information updating control (for example, in steps S6 through S8 of FIG. 6). As the second marks the generator may generate a second mark zero (for example, backup mark 2-0 of FIG. 6) indicating that the updating of the FAT1 is in progress and store the second mark zero on the backup storage, generate a second mark one (for example, backup mark 2-1 of FIG. 6) indicating that the updating of the FAT2 is in progress and store the second mark one on the backup storage, and generate a second mark two (for example, backup mark 2-2 of FIG. 6) indicating that the updating of the directory entry is in progress and store the second mark two on the backup storage. In the management information restoration control the recording controller may restore the FAT1, the FAT2 and the directory entry if the second mark zero is stored on the backup storage (for example, steps S85 and S86 are performed if answer to the determination in step S84 of FIG. 7 is affirmative), restore the FAT2 and the directory entry if the second mark one is stored on the backup storage (for example, steps S88 and S89 are performed if answer to the determination in step S87 of FIG. 7 is affirmative), and restore the directory entry if the second mark two is stored on the backup storage (for example, step S91 is performed if the answer to the determination in step S87 of FIG. 7 is non-affirmative).

Figure 5:
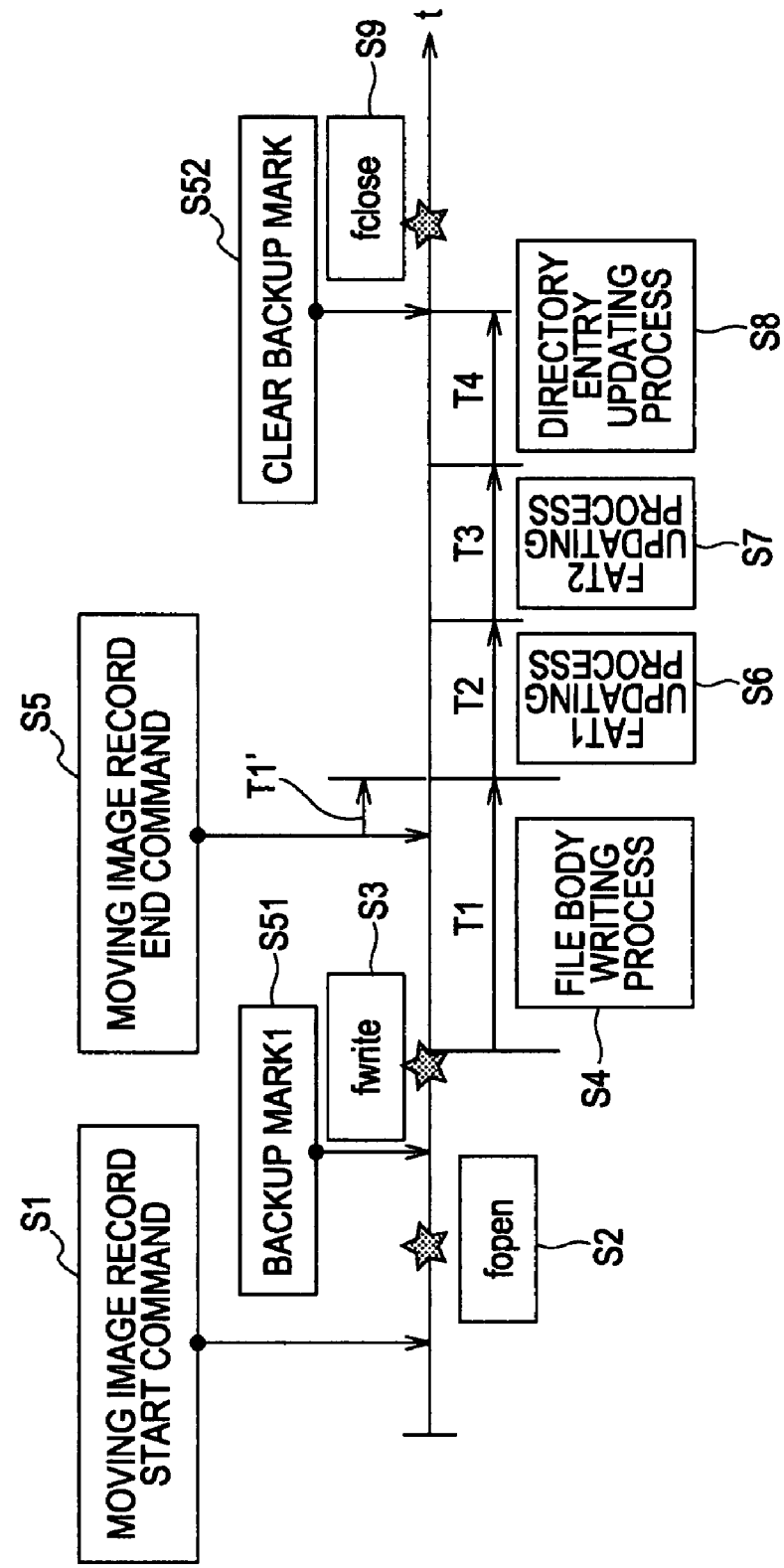
FIG. 5 is a flowchart illustrating a known recording process.

In accordance with one embodiment of the present invention, an information processing method of an information processing apparatus (for example, recording and reproducing apparatus 1 of FIG. 7) for recording data in a file by first unit on a recording medium in accordance with a predetermined file system, includes steps of performing a recording control operation to record a predetermined file on the recording medium, the recording control operation including data recording control for recording successively the data on the recording medium by first unit (for example, file body writing step in step S4 of FIGS. 6 and 8) and management information updating control for updating management information of the predetermined file system on the recording medium, successively generating difference information of the management information by second unit during the recording control operation (for example, updating process of FAT1 in step S6, updating process of FAT2 in step S7, and updating process of directory entry in step S8 as shown in FIGS. 6 and 8), the second unit being an integer multiple of the least common multiple of the first unit and a minimum unit of the predetermined file system, and storing as backup information the difference information on a storage different from the recording medium (for example, file body writing step in step S4 of FIGS. 5 and 8 is repeated by RUV, and each step by RUV is RUV writing processes SR-1 through SR-3 of FIG. 2, and backup table FS updating processes SF-1 through SR-3 are respectively performed at RUV writing processes SR-1 through SR-3).

Figure 21:
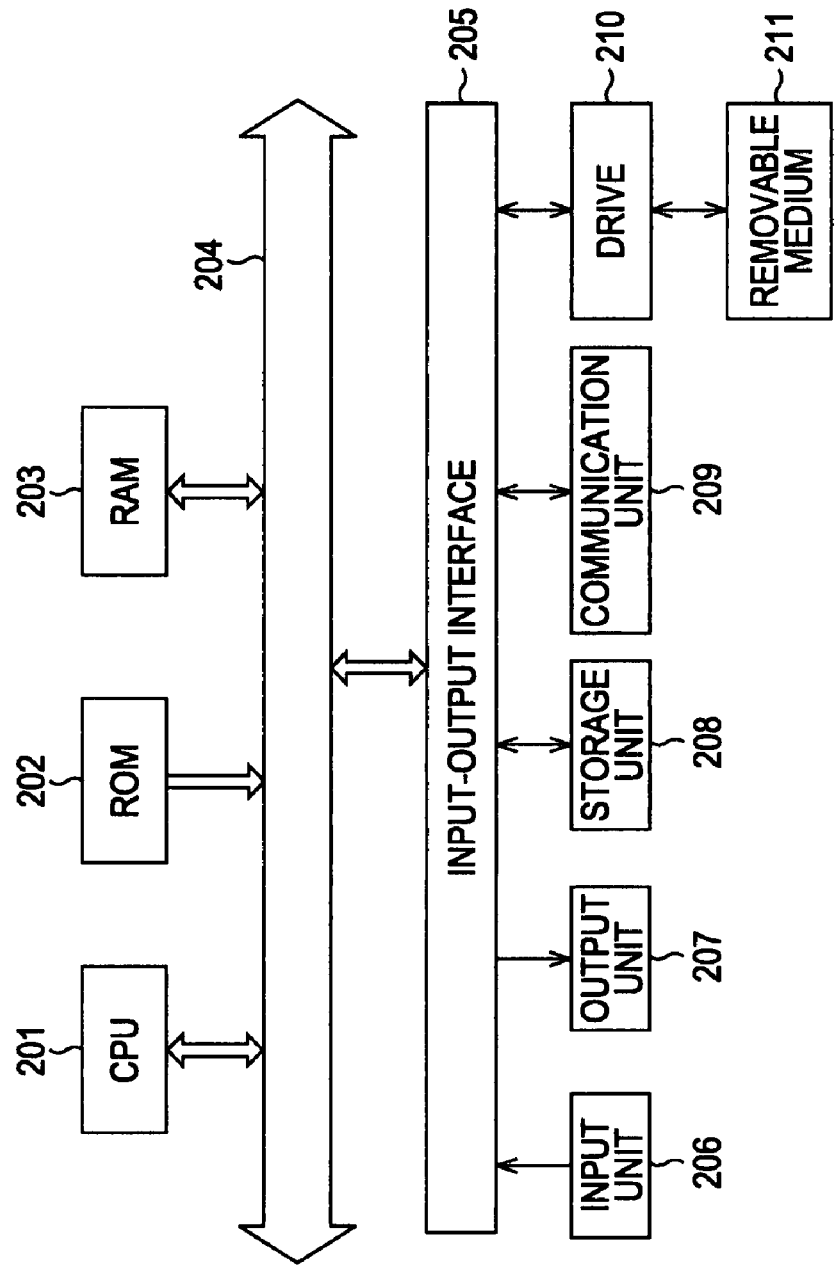
FIG. 21 is a block diagram illustrating a personal computer as the information processing apparatus in accordance with one embodiment of the present invention.

In accordance with one embodiment of the present invention, a program includes the steps of the above-mentioned information processing method, and may be executed by a personal computer of FIG. 21, for example.

The embodiments of the present invention are described below.

FIG. 1 is a functional block diagram of a recording and reproducing apparatus 1 as an information processing apparatus in accordance with one embodiment of the present invention.

As shown in FIG. 1, the recording and reproducing apparatus 1 includes a system controller 11 through a backup memory 19.

The system controller 11 includes a recording and reproducing controller 21 through a backup memory controller 25.

The recording and reproducing controller 21 controls a series of processes to record or reproduce audio-visual data. The recording and reproducing controller 21 will be specifically described later with reference to FIG. 4.

When the recording and reproducing apparatus 1 receives still image data as audio-visual data, the application format controller 22 generates management information of a file header for converting compressed still image data into data in a still image application format such as joint graphics experts group (JPEG), JPEG file interchange format (JFIF), exchangeable image file format (EXIF) or tag image file format (TIFF). When the recording and reproducing apparatus 1 receives an standard definition (SD) moving image as the audio-visual data, the application format controller 22 generates system stream management information for converting the compressed moving image into data in an application format of the moving image, such as MPEG or the like. When the recording and reproducing apparatus 1 receives a high definition (HD) moving image as the audio-visual data, the application format controller 22 generates system stream management information for converting the compressed HD moving image into data in an HD application format such as H264/AVC or the like.

The FAT file system controller 23 controls recording and reproducing of the audio-visual data in a FAT file format. The specific example of recording control by the FAT file system controller 23 will be described in detail with reference to FIG. 4.

In accordance with ATAPI protocol, the memory card and HDD driver controller 24 controls the hard disk drive 16, thereby acquiring internal firm information of the hard disk drive 16 and monitoring the hard disk drive 16. Depending on the status of the drive and medium, the memory card and HDD driver controller 24 issues a record and reproducing command signal to the hard disk drive 16. Similarly, the memory card and HDD driver controller 24 controls the removable medium 5 to issue a record and reproducing start command.

In practice, data is recorded on a hard disk 41 (shown in not FIG. 1 but FIG. 3) within the hard disk drive 16.

The backup memory controller 25 will be described later together with the backup memory 19.

The audio and video input-output interface 12 exchanges audio-visual data with an external device. An audio and video output device 4, composed of a camera, a microphone, etc., as the external device is connected to the audio and video input-output interface 12. The audio and video input-output interface 12 also connects to other external devices including a loudspeaker outputting a sound responsive to audio data output from the audio and video input-output interface 12 and a monitor displaying a video responsive to video data output from the audio and video input-output interface 12.

The encode/decode unit 13 compresses the audio-visual data supplied from the audio and video input-output interface 12 and then supplies the resulting audio-visual data to the data controller 14. The encode/decode unit 13 decompresses compressed audio-visual data supplied from the data controller 14 and supplies the resulting audio-visual data to the audio and video input-output interface 12.

The data controller 14 accumulates management data of the compressed audio-visual data supplied from the encode/decode unit 13 and management data of the audio-visual data generated by the application format controller 22 to be ready for record starting.

The drive controller 15 receives, from the encode/decode unit 13, the compressed audio-visual data to be recorded, as a system stream, by empty packet. Each packet is 2 KB long and tagged with system clock reference (SCR) time information. The drive controller 15 generates a video object unit (VOBU) stored by group of pictures (GOP), and stores on the data controller 14 a CELL or a recording unit video object (RUV), each composed of one or a plurality of VOBUs. The CELL or RUV is recorded on the hard disk drive 16 and the removable medium 5. When the data controller 14 stores the CELL or RUV of several 10 MB, the drive controller 15 repeatedly records the CELL or RUV at a time on the hard disk drive 16. In accordance with one embodiment of the present invention, a file is generated on a per one record chapter, and then recorded on media such as the hard disk drive 16 and the drive controller 15.

The user interface (I/F) 17 receives an operational input from an operation device 2 operated by a user. The operation device 2 may include a remote controller or a touchpanel using a panel built in the recording and reproducing apparatus 1.

The PC input-output interface 18 exchanges information with a personal computer 3.

As shown in FIG. 2, an application format backup table 31 (hereinafter referred to as backup table App31) and a file system backup table 32 (backup table FS32) are recorded on the backup memory 19. The backup memory controller 25 (FIG. 1) describes and updates information to the backup table App31 and the backup table FS32.

Writing process of RUV, as a set of VOBUs (hereinafter referred to as RUV writing process) SR-K (K is an integer and K=1, 2, 3 in FIG. 2) is performed to the hard disk drive 16. At each SR-K, the backup memory controller 25 performs backup process of update difference information in an application format to the backup table App31 (hereinafter referred to as backup table App updating process) SA-K and backup process of update difference information of the file system to the backup table FS32 (hereinafter referred to as backup table FS updating process) SF-K.

In the updating process applied to the backup table App31 and the backup table FS32, the update difference information may overwrite previous update difference information or may be stored on a different area with the previous update difference information left intact. In the latter case, a plurality of pieces of update difference information coexist. The difference between the two cases will be described later.

In accordance with one embodiment of the present invention, the update difference information of the application format is information relating to a difference between attribute management information data of the application format prior to updating and attribute management information data of the application format subsequent to updating, and the update difference information of the file system is information relating to a difference between attribute management information of FAT file system prior to updating and attribute management information of the FAT file system subsequent updating.

More specifically, at the opening of a file (fopen), an entry of a new record file to be newly recorded (initial attribute information determined at the start of recording, such as entry name, entry, video attribute of application attribute, audio attribute, and application format attribute information) is created and described in the backup table App31.

Also, at fopen, an entry of the new record file to be newly recorded (initial attribute information of the file system determined as the start of recording, such as file name, directory, entry information, file creation date and time, and FAT file attribute information) is created and described in the backup table FS32.

In other words, each time a new file is created, the backup table App31 and the backup table FS32 for that file are created.

Each time the writing of 1 RUV of the file body data is completed as an application format stream of MPEG compressed data of a moving image, the update attribute information of the file body data (update attribute information such as an entry ID, time, and size) is backed up in the backup table App31 at the RUV writing process SR-K. The backup table App updating process SA-K is thus successively performed.

At each RUV writing process SR-K, update attribute information of the file system data (update attribute information such as an entry ID, time, and size, a file entry ID newly created if file size border is exceeded, file creation date and time, and a backup entry of the initial attribute information system determined at the start of recording, such as FAT file attribute information) is successively backed up at the backup table FS32. In other words, the backup table FS updating process SF-K is successively performed.

When the application format controller 22 does not recognize a medium on the drive, the backup memory controller 25 of FIG. 1 clears the content or the entity of the backup table App31 and the backup table FS32.

When a recording destination is the removable medium 5 as a memory card drive, the backup memory controller 25 detects the unloading of the removable medium 5. The backup memory controller 25 clears the content or the entity of the backup table App31 and the backup table FS32, each of which stores the backup information of the interior of the memory card drive to be unloaded.

The PC input-output interface 18 shifts from a logically separated state, thereby connecting the drive to one of the FAT file system controller 23 and the application format controller 22 in the system controller 11. The backup memory controller 25 thus clears the content or the entities of the backup table App31 and the backup table FS32 corresponding to the interior of one of the hard disk drive 16 and the removable medium 5, each of which can be updated.

The update difference information backed up in the backup table App31 and the backup table FS32 is used to restore data subsequent to a power interruption of the recording and reproducing apparatus 1. Backup marks indicating a process progress are also used. The backup mark is described in at least one of the backup table App31 and the backup table FS32 (in both the backup table App31 and the backup table FS32 in this embodiment). The restoration operation and the detail of the backup mark will be described later with reference to FIG. 5.

The size of the backup memory 19 (hereinafter also referred to as backup memory size) during a high-definition long-time photographing operation and the count K of backup table FS updating processes SF-K (hereinafter also referred to as FS difference backup count K) are described below.

The hard disk drive 16 may be used as a recording medium for audio-visual stream capturing. Long-time continuous recording is possible with a single file. The FS difference backup count needs to be determined taking into consideration the backup memory size.

When a long-time continuous recording operation is performed, the updating of FS management information to the hard disk drive 16 is performed at the end of the recording operation. In other words, the FS update difference information of the FS management information of 1 RUV data cannot be written on the hard disk drive 16 during recording. The FS update difference information needs to be continuously backed up on the backup memory 19 until the end of the recording operation.

A simplified case is considered. For example, only the update difference information of the FAT management information is handled. A data size as large as 8 bytes required to set and clear the backup mark to be discussed later might be considered as being within an acceptable margin of error. A recording start mark, open information of a recording stream file, and file generation information might fall within an acceptable margin of error. Without considering that one chapter of continuous recording reaches the upper limit of one file size of the file system, a file of long time and vast amount of data might be produced.

The backup memory size required to back up the FS update difference information to the backup memory 19 at the RUV writing process SR-K are now considered. For example, the backup memory size required to back up compressed audio-visual stream data HD-XP of 1 RUV (lasting about 5 seconds) and the backup memory size required to back up data SD-LP of 1 RUV (lasting about 30 seconds) are considered.

More specifically, HD-XP data has a total data size of 16 bytes of a 6 byte header and 10 byte data, and 1 RUV of the HD-XP is about 5 seconds. Data of about 60 GB is photographed for about 8 hours. The backup memory size is 16 bytes×5760 (28800 seconds/5 seconds)=92160 bytes. In other words, a backup memory size of about 90 KB is required.

1 RUV of SD-LP data is 30 seconds, and data of about 60 GB is photographed for about 40 hours. The backup memory size is 16 bytes×4800 (144000 seconds/30 seconds)=76800 bytes. In other words, a backup memory size of about 75 KB is required.

The use of a flash memory of 64 KB for the backup memory 19 is considered. The backup memory 19, when approaching the memory full state thereof, needs to be switched to another memory area, and there are very rare system specifications that allow only the FS to use exclusively the backup memory 19. For example, if two memory areas, each having a size of 32 KB, are alternately used, specifications may be set to be less rigorous. For example, in HD-XP of 1 RUV data having a short audio-visual display time, 1 RUV of about 5 seconds immediately prior to a power interruption may be discarded, and data of about 30 seconds immediately prior to power interruption may be discarded during long-time continuous recording of 2 days. If specifications are set to be less rigorous in this way, the rate of backup of the FS update difference information to the backup memory 19 may be every 2 to 3 RUVs instead of every RUV.

In general specifications, recording may be stopped when a write error takes place in the middle of an RUV during long-time photographing and recording operation in order to save memory of the backup memory 19. Video record up to the write error may be recorded as one chapter on a recording medium (the hard disk drive 16 for convenience of explanation), and the photographing and recording operation is thus stopped.

The FS update difference information in the recording of stream data of 1 RUV and, to be safe, 2 to 3 RUVs immediately prior to the power interruption are stored on the backup memory 19, and overwrites preceding FS update difference information.

At each RUV writing process SR-K, more specifically, at the writing of data of 1 RUV, the backup memory controller 25 successively backs up the FS update difference information. The backup memory 19 successively shifts the address of the FS update difference information within an address range of a predetermined assigned memory area in order to store successively new FS update difference information. When the assigned memory area becomes full, the address position is shifted back to a first position. In other words, the backup memory controller 25 controls the backup memory 19 in a ring buffer fashion.

The hard disk drive 16 updates the FS management information of one photographed file only when the one file has been written as a result of stopping photographing or restoration from the power interruption.

A power interruption taking place during updating of the FS can destroy the FS management information. The FS management information, if destroyed, is restored as below. A set of RUVs continuously stored by RUV on the hard disk drive 16 immediately before the power interruption may be one file. If total data size and address position of the one file are identified, and update difference information sufficient to update the written FS is stored on the backup memory 19, the FS management information is restored from the FS update difference information finally backed up on the backup memory 19 at the occurrence of the power interruption.

Backup control of the FS update difference information (difference data of the FS management information) in continuous photographing and recording operation is described below.

The final total data size and the file address positions of one file in the continuous photographing and recording operation are identified, and the FS update difference information sufficient to update the written FS is stored on the backup memory 19. To this end, data of the final total data size of the one file is stored as one piece of the FS update difference information (backup information) on the backup memory 19. The FS update difference information for use in updating the written FS subsequent to the successful writing of the final RUV data is ring-buffered on the backup memory 19 in write address position management control so that no overwriting is preformed. If the application format above the FS layer needs restoration before FS restoration, the restoration control may be performed on the application format. The final RUV that has been successfully written and the RUV data of several RUVs prior to the final RUV are ring-buffered so that no overwriting takes place. In this way, the size of the backup memory 19 is controlled to 32 KB, for example.

The backup memory 19 needs a relatively large memory size of 32 KB for the reason discussed below. The backup operation of the FS update difference information to the backup memory 19 is performed each time data of 1 RUV is written on the recording medium. If the backup memory 19 is constructed of a flash memory, the writing cycle endurance of thereof is about 300,000 cycles to one write block. If frequent re-writing cycles take place on the same block, the entire flash memory composed of a large set of blocks reaches soon the life thereof. It is thus necessary to use the backup memory 19 uniformly in ring-buffer address control. The backup memory 19 needs to be protected from block degradation due to localized writing. To this end, a predetermined number of blocks, namely, a predetermined memory size is required.

In the following embodiment of the present invention applied to an arrangement where a plurality of files are recorded as one chapter during continuous long-time photographing and recording operation.

For example, in this arrangement, a continuous long-time photographing and recording operation is performed beyond a maximum data size of one FS file data. One file is not handled as one chapter. Data is handled as one file every predetermined size set in the application format controller 22, for example, every several 100 MB or several GB, and a set of these files is recorded. More specifically, a plurality of separate files in one chapter are recorded.

For example, in the case of long-time recording, the application format controller 22 handles a plurality of files consecutive in time as separately recording files within one chapter using MPEG-PS reproducing technique, namely, seamless concatenation reproducing technique of a plurality of MPEG streams. The one chapter is then reproduced.

In a photographing operation of 8 hours performed using the HD-XP hard disk drive 16 having a capacity of 60 GB, one file may be recorded every 1 GB. The hard disk drive 16 then stores 60 separate consecutive files.

FS update difference information is present for each of the files successively created. During the continuous photographing and recording operation (recording of one chapter), a writing operation is performed on each of the files successively opened on the hard disk drive 16. Each time each file is completed, the FS management information is finalized for each completed file.

When the writing operation is completed on one file belonging to one chapter during photographing, the recording and reproducing apparatus 1 updates the FS using the FS update difference information of that file. The recording and reproducing apparatus 1 opens a next file, and performs the writing operation to the next file within the same chapter. This process is repeated.

In another arrangement, the recording and reproducing apparatus 1 does not perform the FS updating process on a per file basis during the long-time photographing operation. At the moment the long-time photographing operation is completed, the recording and reproducing apparatus 1 writes and updates the FS in connection with the FS management information for all files. This technique is described below.

In this technique, the FS updating process needs to be performed using the FS update difference information of all files including streams consecutive in time within one chapter. If a power interruption takes place during this process, the FS update difference information needs to be read from the backup memory 19 to restore the FS at power on next time.

Once one file is completed and finalized during the long-time photographing operation, that file is not updated. The recording and reproducing apparatus 1 sets the FS update difference information of the completed one file to be in a write-protect status on the backup memory 19. In the ring-buffering process, the FS update difference information is excluded from a target address range of FS update difference information to be written on the backup memory 19.

During the one chapter of the long-time continuous photographing and recording operation, the recording and reproducing apparatus 1 handles the FS update difference information of the completed and written file as FS backup information requiring no updating. The backup memory 19 handles the FS update difference information as having a write-protect attribute during the current long-time continuous photographing and recording operation.

When the recording and reproducing apparatus 1 performs the above-mentioned control process, the size of the recording data substantially exceeds the maximum data size of one file of the FS for long-time recording. Even if the one chapter is constructed of a plurality of files, the FS update difference information of a plurality of files required to restore the FS management information is reliably stored on the backup memory 19 without any problem. Even if a power interruption takes place during the updating of the FS with the long-time photographing operation substantially in progress, the FS can be restored.

A series of process steps performed until the recording and reproducing apparatus 1 of FIG. 1 records one file (chapter) of moving image data on the hard disk drive 16 are described below with reference to FIG. 3.

In step S1, the operation device 2 issues a moving image record start command. The recording and reproducing apparatus 1 opens a file (fopen) on the hard disk 41 on the hard disk drive 16 in step S2.

In step S2, the recording and reproducing apparatus 1 creates an entry of new record file to be recorded (initial attribute information determined at the start of recording, such as entry name, entry, video attribute of application attribute, audio attribute, and application format attribute information) and describes the entry in the backup table App31 of FIG. 2. The recording and reproducing apparatus 1 also creates an entry of the new record file to be newly recorded (initial attribute information of the file system determined as the start of recording, such as file name, directory, entry information, file creation date and time, and FAT file attribute information) and describes the entry in the backup table FS32.

In step S3, the recording and reproducing apparatus 1 starts a write operation (hereinafter referred to as fwrite) of a file on the hard disk 41. In step S4, the recording and reproducing apparatus 1 writes file body data on an area 41-1 of the hard disk 41 by RUV (hereinafter referred to as file body writing operation).

The file body writing operation in step S4 includes a repetition of the RUV writing process SR-K of FIG. 2. In step S4, the backup table App updating process SA-K and the backup table FS updating process SF-K are performed in step with the RUV writing process SR-K.

When a moving image record end command is issued from the operation device 2 or the like in step S5, the recording and reproducing apparatus 1 completes the writing of the final RUV data to the hard disk 41. The recording and reproducing apparatus 1 creates information such as file entry information, creation date and time, and size from a variety of information acquired from the movie recording control unit 61 of FIG. 4 in the system controller 11. In step S6, the recording and reproducing apparatus 1 performs an updating process on FAT1 on an area 41-2 on the hard disk 41 (hereinafter referred to as FAT1 updating process). In step S7, the recording and reproducing apparatus 1 performs an updating process on FAT2 on an area 41-3 on the hard disk 41 (hereinafter referred to as FAT2 updating process). In step S8, the recording and reproducing apparatus 1 performs an updating process on a directory entry on an area 41-4 on the hard disk 41 (hereinafter referred to as directory entry updating process).

In step S9, the recording and reproducing apparatus 1 closes the file on the hard disk 41 (this step is hereinafter referred to as fclose).

Figure 3:
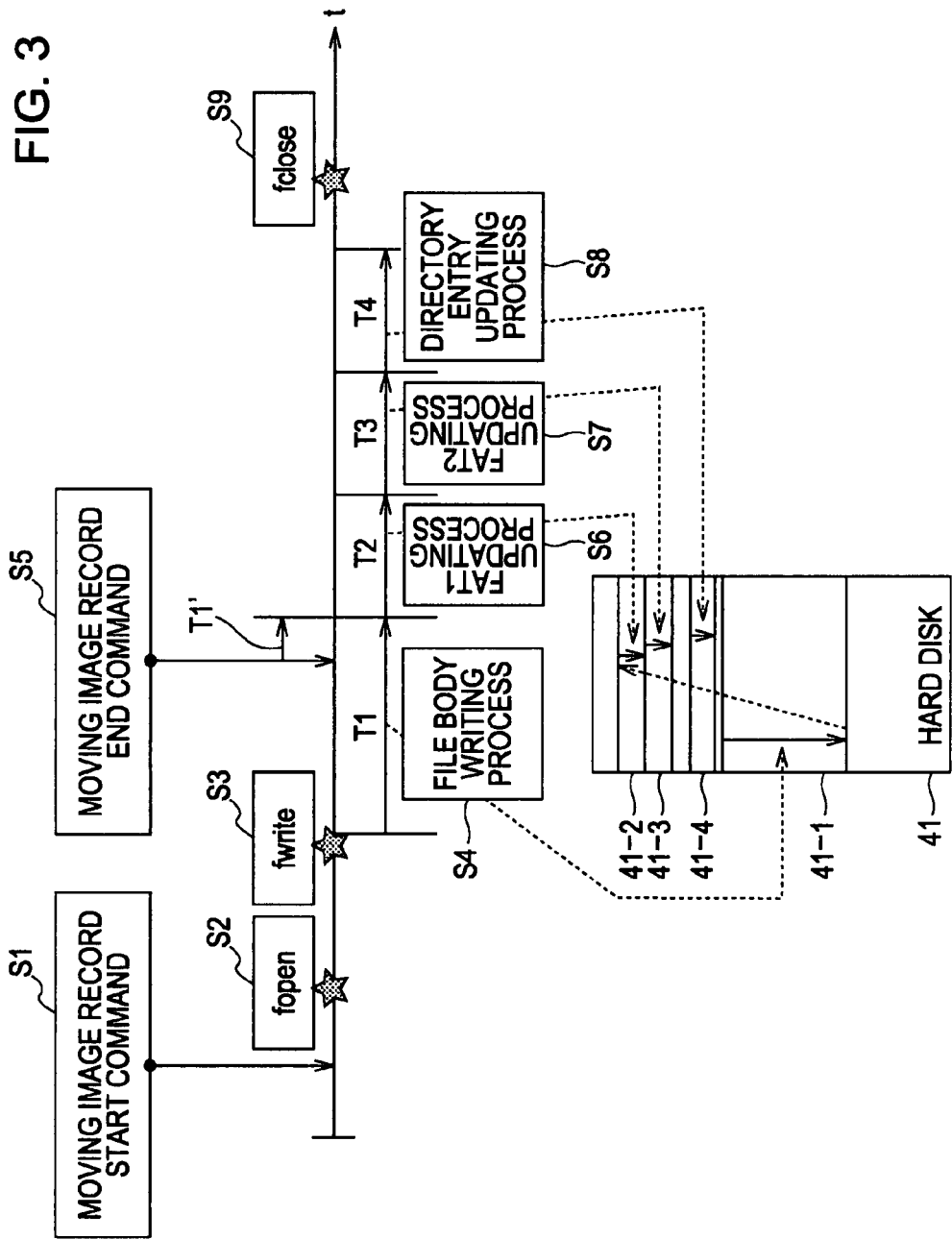
FIG. 3 is a flowchart generally illustrating a recording process of the recording and reproducing apparatus of FIG. 1.

As shown in FIG. 3, steps S6 through S8 are performed subsequent to the end of the writing of the final RUV, i.e., the FAT1, the FAT2 and the directory entry are updated subsequent to the end of the writing of the file body. The updating timing of the FAT1, the FAT2 and the directory entry is not limited to the example of FIG. 3. The FAT1, the FAT2 and the directory entry may be updated each time a predetermined unit of the file body is written.

The process in which the FAT1, the FAT2 and the directory entry are updated each time a predetermined unit of the file body is written will be described later. The discussion that follows is based on the premise that the FAT1, the FAT2 and the directory entry are updated after the writing of the file body is entirely completed.

Figure 4:
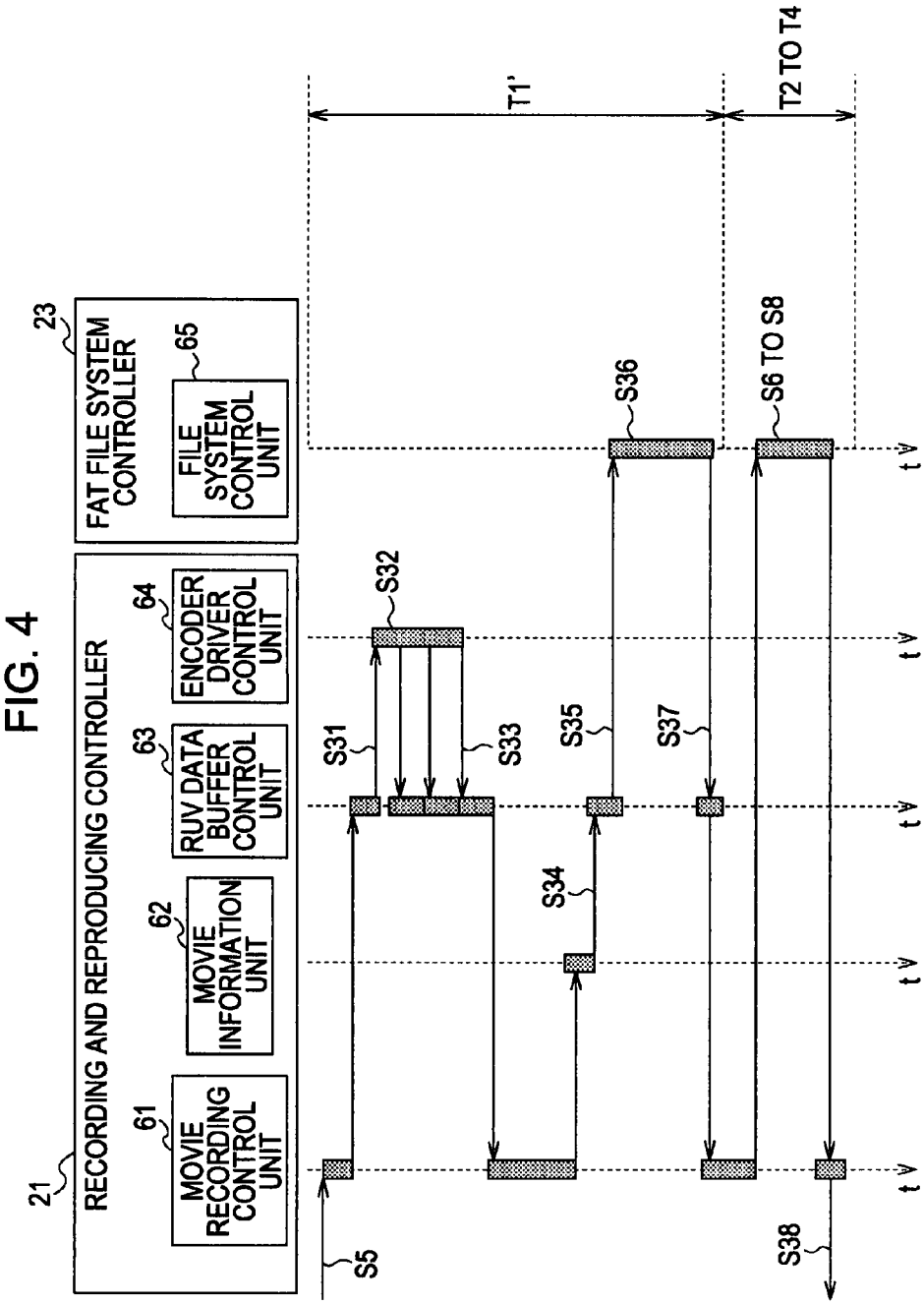
FIG. 4 is a flowchart illustrating in detail part of the recording process of FIG. 3 performed subsequent to the issue of a moving image record end command.

FIG. 4 is a flowchart illustrating the process to be performed subsequent to the moving image record end command issued in step S5 of FIG. 3.

As shown in FIG. 4, the recording and reproducing controller 21 includes the movie recording control unit 61 through an encoder driver control unit 64. The movie recording control unit 61 through the encoder driver control unit 64 perform processes indicated by arrow-headed broken lines respectively extending therefrom. The FAT file system controller 23 includes a file system control unit 65, and performs process indicated by an arrow-headed broken line.

When the moving image record end command is issued in step S5, the movie recording control unit 61 notifies the RUV data buffer control unit 63 of the moving image record end command.

The RUV data buffer control unit 63 controls the encoder driver control unit 64 in step S31, thereby starting creating a final RUV. In step S32, the encoder driver control unit 64 controls the encode/decode unit 13 through the drive controller 15 of FIG. 1, thereby creating a series of VOBUs of the final RUV and VOBU_Table information. For each VOBU, the RUV data is stored on the buffer of the data controller 14 controlled by the RUV data buffer control unit 63. A series of VOBUs of the final RUV is thus created, and the VOBU_Table information thereof is also stored on the buffer of the data controller 14.

When the series of VOBUs of the final RUV and the VOB-U_Table information are stored on the buffer of the data controller 14, the RUV data buffer control unit 63 notifies the movie recording control unit 61 of a response indicating the completion of the creation of the final RUV in step S33.

In response to the notification, the movie recording control unit 61 controls the movie information unit 62 in step S34, thereby attaching data (hereinafter referred to as info) in the application format to the final RUV. In step S35, the movie recording control unit 61 requests the file system control unit 65 to write the final RUV.

In step S34, the movie information unit 62 controls the application format controller 22 and the FAT file system controller 23, thereby attaching the application information as the info to the data stored on the buffer on the data controller 14. The final RUV to be written as a record system stream is thus completed. In step S35, a final RUV write command is issued to the file system control unit 65.

In step S36, the file system control unit 65 controls the memory card and HDD driver controller 24 and the drive controller 15, thereby writing the final RUV as a file body on the area 41-1 (see FIG. 3) on the hard disk 41 on the hard disk drive 16.

Steps S31 through S36 to be performed subsequent to the moving image record end command in step S5 are application format write control.

When the application format write control is completed, the file system control unit 65 notifies the movie recording control unit 61 via the RUV data buffer control unit 63 in step S37 that the writing operation of the final RUV to the hard disk drive 16 has been completed.

The movie recording control unit 61 notifies the file system control unit 65 of a file close operation. Upon receiving the notification, the file system control unit 65 performs steps S6 through S8, thereby updating the FAT1, the FAT2 and the directory entry.

Power of the recording and reproducing apparatus 1 might be interrupted in the middle of moving data recording process discussed with reference to FIGS. 3 and 4.

As shown in FIG. 3, each of a period T2 of the FAT1 updating process in step S6, a period T3 of the FAT2 updating process in step S7, and a period T4 of the directory entry updating process in step S8 is substantially equal to a period of the file body writing process in step S4. In practice, however, each of the period T2, the period T3 and the period T4 is substantially shorter than the period T1. The probability of the occurrence of power interruptions during each of the period T2, the period T3 and the period T4 is much smaller than the probability of the occurrence of power interruption during the period T1.

More specifically, the size of the area 41-2 of the FAT1 of FIG. 3 is defined by the Microsoft White Paper. The standard size of one FAT1 is about 3 MB. If only difference information data of one RUV is updated in the FAT1 updating process in step S6, four sectors (2 KB) are updated per FAT1. Also, four sectors are updated per FAT2. The updating of the directory entry is also performed on four sectors. The writing time to the medium is approximately equal to writing time in FAT.

If a small hard disk 41 is used as a recording medium, a write rate to the medium is 80 Mbps to 180 Mbps if time elapse of update timing of the FS of one command write time is considered. The actual write time of the FS difference information at every four sectors (2 KB) falls within the time of a command response ranging from: 50 to 150 μs. Of one command write time, a seek operation (operation represented by solid line or broken line within the hard disk 41 of FIG. 3) takes the longest time. The seek operation is initiated in response to the command, and the four sectors are updated. One seek operation takes 10 to 20 ms.

If a power interruption takes place in the middle of the FS updating process within the periods T2 through T4, the FS update information write time to the medium takes ½₀₀ to ½₀₀ of the periods T2 through T4. For example, if one chapter photographing time, namely, the entire time of the periods from T1 through T4 is 200 seconds, the FS update time of the periods T2 through T4 in the photographing time is ½₀₀₀₀ of the entire time. The probability of the occurrence of a power interruption during the FS update information write time to the medium is about ½₀₀₀₀₀₀. A power interruption thus rarely occurs during the FS update period.

The FS update periods T2 through T4 having a low probability of occurrence of power failure are not considered in the known art. The known art considers a first timing at which a power interruption can take place in the file body writing process in step S4 during the period T1 and a second timing at which a power interruption can take place subsequent to the directory entry updating process in step S8 during the period T4. In the known art as shown in FIG. 5, a backup mark 1 is provided in step S51 prior to fwrite in step S3, and the backup mark 1 is cleared in step S52 subsequent to the end of the directory entry updating process in step S8 during the period T4. The number "1" of the backup mark 1 is used to differentiate the backup mark from a backup mark 2 to be discussed later.

If a power interruption takes place with the backup mark 1 present, the power interruption is regarded to have occurred at the first timing within the period T1, according to the known art. The first timing is in a "normal state prior to updating of the FAT" and the FAT difference can be updated based on data difference information from the application layer. Data restoration is thus possible. If the backup mark 1 is not present, a power interruption is regarded to have occurred at the second timing subsequent to the period T4. At the second timing, the FAT and the file are in normal state after updating. Since the FS is in normal state at both the first timing and the second timing, the recording and reproducing apparatus 1 can restore data using the FS, thereby performing the fclose operation again.

If the backup mark 1 is present, a power interruption may have taken place not only at the first timing during the period T1 but also at a third timing within the FS updating periods from T2 through T4 though at a low probability. The probability of occurrence of power interruption at the third timing is substantially low in comparison with that at the second probability, but not zero. If a power interruption takes place at the third timing, the FAT is in the middle of updating and thus not in normal state. The FAT may not be correctly restored. If the FAT is not restored, an unused area invisible from the application layer remains on the medium, and the unused area remains unused until next formatting.

The backup mark 1 alone cannot discriminate between the first timing within the period T1 for the file body writing and the third timing within the FS updating periods T2 through T4. The probability of occurrence of power interruption at the third timing is low but not zero. The known art does not consider a corrective step to a power interruption that can have taken place during the FS updating periods T2 through T4.

The inventors of this invention have invented a technique to restore a file system even if the file system is destroyed by a power failure at the third timing within the periods T2 through T4. In accordance with the technique, recorded data is restored with an application format by adding backup marks 2-0 through 2-2 in addition to the backup mark 1 as shown in FIG. 6.

More specifically, as shown in FIG. 6, the backup mark 1 is provided in step S51 prior to a fwrite operation, and the backup mark 2-0 is provided in step S60 at the end of the period T1 for file body writing process in step S4, a backup mark 2-1 is provided in step S61 at the end of the period T2 for the FAT1 updating process in step S6. Furthermore, a backup mark 2-2 is provided in step S62 at the end of the period T3 for the FAT2 updating process in step S7, and the backup marks are cleared in step S52 at the end of the period T4 for the directory entry updating process in step S8.

That the backup marks 1, 2-0, 2-1 and 2-2 are provided means that the backup marks 1, 2-0, 2-1 and 2-2 overwrite (update) in at least one of (in the present embodiment, both) the backup table App31 and the backup table FS32 in the backup memory 19 of FIG. 2. That the backup marks are cleared means that the backup marks described in the backup table App31 and the backup table FS32 are deleted and in the case of FIG. 6, the backup mark 2-2 is mainly deleted.

With this arrangement, the power interruption timing is clearly discriminated. For example, the power interruption timing is within the period T1 if the backup mark 1 is present, within the period T2 if the backup mark 2-0 is present, within the period T3 if the backup mark 2-1 is present, and within the period T4 if the backup mark 2-2 is present.

When power is back on after a power interruption, the recording and reproducing apparatus 1 recognize the power interruption timing by referring to the presence or absence of each of the backup marks 1 through 2-2, restores the FS layer based on the recognition result, and as necessary, restores the application layer. This process is referred to as an FS layer/application layer verification and restoration process. FIG. 7 is a flowchart illustrating an example of the FS layer/application layer verification and restoration process using the presence or absence of the backup marks 1 through 2-2.

In step S81, the recording and reproducing apparatus 1 determines whether a backup mark is present in each of the backup table App31 and the backup table FS32 on the backup memory 19 of FIG. 2.

The absence of the backup mark means that the data updating is normally completed with the backup mark cleared in step S52 of FIG. 6 with the writing of the file body of the moving image data completed (step S4) and the writing of the update information of the file system completed (steps S6 through S8). In such a case, the verification and restoration process of the FS layer and the application layer is not necessary. If no backup mark is present, the answer to the determination in step S81 is non-affirmative, and the FS layer/application layer verification and restoration process thus ends.

If any of the backup marks 1 through 2-2 is described in the backup table App31 and the backup table FS32, the answer to the determination in step S81 is affirmative, and processing proceeds to step S82.

In step S82, the recording and reproducing apparatus 1 determines whether the backup mark is a backup mark 1.

The backup mark 1 means that a power interruption may have taken place in the middle of the writing of the file body of the moving image data, namely, within the period T1 of FIG. 6. The file body needs to be restored by the application format controller 22 of FIG. 1. The FS layer is prior to updating and in a normally operating condition. The FS update difference information is backed up in a state immediately prior to the start of writing of the final RUV data. It is thus unnecessary to restore the FS from the update difference information of the FS layer. In the case of the backup mark 1, the answer to the determination in step S82 is affirmative, and step S94 and subsequent steps are performed in order to verify and restore the application layer. Step S94 and subsequent steps will be described later.

If the backup mark is not a backup mark 1, the FS layer can be destroyed. The answer to the determination in step S82 is non-affirmative, and the recording and reproducing apparatus 1 determines in step S83 whether the FS layer is normal.

If it is determined that the FS layer is normal, the answer to the determination in step S83 is affirmative to verify and restore the application layer. Steps S94 and subsequent steps are performed as will be described later.

If it is determined that the FS layer is in an abnormal state, the answer to the determination in step S83 is non-affirmative. Processing proceeds to step S84.

In step S84, the recording and reproducing apparatus 1 determines whether the backup mark is a backup mark 2-0.

The backup mark 2-0 means that a power interruption may have taken place in the middle of the writing of the FAT1 update information, namely, during the period T2 with the file body of the moving image data updated. The FS layer might be destroyed in this case. The recording and reproducing apparatus 1 verifies the state of the FS layer in step S83. If the FS layer is found to be in an abnormal state, the answer to the determination in step S83 is non-affirmative, and the answer to the determination in step S84 is affirmative. Processing proceeds to step S85.

In step S85, the recording and reproducing apparatus 1 restores the FAT1 and the FAT2 on the areas 41-2 and 41-3 on the hard disk 41 of FIG. 3 using the backup. In step S86, the recording and reproducing apparatus 1 restores the directory entry on the area 41-4 on the hard disk 41 with the backup.

The backup here refers to update difference information of each of the FAT1, the FAT2 and the directory entry described in the backup table FS32 of the backup memory 19 of FIG. 2.

Steps S85 and S86 are performed because of the following reason. If the FAT1 is left destroyed, the FS is read and no file is found therewithin. This leads to the determination that the FAT1 is destroyed. The FAT2 is subsequently read and used. The FS thus remains normally operative. This process of reading the FAT2 instead of the FAT1 takes time and is redundant. Subsequent FS difference restoration based on the premise that the FS is normal leads to an error. The FAT1 is thus corrected.

In step S92, the recording and reproducing apparatus 1 determines whether the FS layer has been restored.

If the FAT1 of the FS is corrected, the FS operates normally. In such a case, the answer to the determination in step S92 is affirmative to verify and restore the application layer. Steps S94 and subsequent steps are performed as will be described later.

If the correction of the FS layer fails, the answer to the determination in step S92 is non-affirmative. In step S93, the recording and reproducing apparatus 1 notifies a user of a data error for reformatting. The FS layer/application layer verification and restoration process is thus completed.

The backup mark 2-1 means that a power interruption may have taken place in the middle of the information updating of the FAT2, namely, during the period T3 with the updating of the file body of the moving image data completed and the FAT1 updated. The FAT2 might be in the middle of updating and destroyed. The directory entry is prior to updating and fails to match the FAT1. The FS layer might be also destroyed. The state of the FS layer is verified in step S83. If the FS layer is found to be in an abnormal state, the answer to the determination in step S83 is non-affirmative, and the answer to the determination in step S84 is non-affirmative, and the answer to the determination in step S87 is affirmative. Processing proceeds to step S88.

In step S88, the recording and reproducing apparatus 1 restores the FAT2 on the area 41-3 on the hard disk 41 of FIG. 3 with the backup. In step S89, the recording and reproducing apparatus 1 restores the directory entry on the area 41-4 on the hard disk 41 with the backup.

The backup herein refers to the update difference information of each of the FAT2 and the directory entry described in the backup table FS32 on the backup memory 19 of FIG. 2.

In step S92, the recording and reproducing apparatus 1 determines whether the FS layer is restored.

If the FS layer is successfully restored, the answer to the determination in step S92 is affirmative to verify and restore the application layer. Step S94 and subsequent steps are then performed as will be described later.

If the restoration of the FS layer fails, the recording and reproducing apparatus 1 determines a file system error and prompts the user to reformat. The answer to the determination in step S92 is non-affirmative. In step S93, the recording and reproducing apparatus 1 notifies the user of a data error. The FS layer/application layer verification and restoration process is thus completed.

The backup mark 2-2 means that a power interruption may have taken place in the middle of the writing of the update information of the directory entry, namely, during the period T4 subsequent to the writing of the file body of the moving image data and the updating of the FAT1 and the FAT2. Since the directory entry is prior to updating and fails to match the FAT1 and the FAT2, the FS layer might be destroyed. In step S83, the FS layer is verified. If the FS layer is found to be in an abnormal state, the answer to the determination in step S83 is non-affirmative, the answer to the determination in step S84 is non-affirmative, and the answer to the determination in step S87 is non-affirmative. Processing proceeds to step S91.

In step S91, the recording and reproducing apparatus 1 restores the directory entry on the area 41-4 on the hard disk 41 of FIG. 3 with the backup.

The backup herein refers to the update difference information of the directory entry described in the backup table FS32 on the backup memory 19 of FIG. 2.

In step S92, the recording and reproducing apparatus 1 determines whether the FS layer has been successfully restored.

If the FS layer has been successfully restored, the answer to the determination in step S92 is affirmative to verify and restore the application layer. Step S94 and subsequent steps are then performed as will be described later.

If the restoration of the FS layer fails, the recording and reproducing apparatus 1 determines a file system error and prompts the user to reformat. The answer to the determination in step S92 is non-affirmative, and the recording and reproducing apparatus 1 notifies the user of a data error in step S93. The FS layer/application layer verification and restoration process is thus completed.

Step S94 and subsequent steps to verify and restore the application layer are described below.

In step S94, the FS layer is in a normal state.

In step S94, the recording and reproducing apparatus 1 determines whether the application layer on the area 41-1 on the hard disk 41 of FIG. 3 is normal.

If it is determined in step S94 that the application layer is normal, the recording and reproducing apparatus 1 clears the backup mark in step S97. The FS layer/application layer verification and restoration process is thus completed.

If it is determined in step S94 that the application layer is not normal, the recording and reproducing apparatus 1 restores the application layer in step S95. In step S96, the recording and reproducing apparatus 1 determines whether the application layer has been successfully restored.

More specifically, the recording and reproducing apparatus 1 verifies that the final write addresses match by RUV in the application layer. If the final write address fails to match, the recording and reproducing apparatus 1 deletes the file body data by RUV in a direction of reducing recording time.

If the length of the application format matches the data length of the FS, the recording and reproducing apparatus 1 determines in step S96 that the application layer has been successfully restored. In step S97, the recording and reproducing apparatus 1 clears the backup mark. The FS layer/application layer verification and restoration process is thus completed.

If the length of the application format fails to match the data length of the FS, the recording and reproducing apparatus 1 restores the FS by adjusting the data length of the FS by RUV to the application data length.

If the application layer has been successfully restored, the recording and reproducing apparatus 1 determines in step S96 that the application layer has been successfully restored. The recording and reproducing apparatus 1 clears the backup mark in step S97. The FS layer/application layer verification and restoration process is thus completed.

If the restoration attempt of the application layer has failed, the answer to the determination in step S96 is non-affirmative. The restoration process of the application layer ends in a file system error. Processing proceeds to step S93. In step S93, the recording and reproducing apparatus 1 prompts the user to reformat (initialize) by notifying the user of a data error. The FS layer/application layer verification and restoration process is thus completed.

As described above, the backup marks 1 through 2-2 are used in the example of FIGS. 6 and 7. Even if a power interruption takes place within the FS layer update period of the periods T2 through T4, the FS layer is restored and an ineffective area (unused area invisible from the application layer) is not caused. In the restoration of the FS layer, one of the FAT1, the FAT2 and the directory entry forming the FS layer needing restoration is restored. More specifically, any one of the FAT1, the FAT2 and the directory entry needing no restoration is free from update process of the FS.

During normal recording operation, the backup marks 1 through 2-2 are provided, and recording speed is thus affected. If high speed is required of the recording process, only backup marks 1 and 2 may be provided as shown in FIG. 8.

FIG. 8 is a flowchart illustrating the recording process employing another technique invented by the inventors of this invention, and different from that of FIG. 6. More specifically, as shown in FIG. 8, the backup mark is provided in step S51 prior to the fwrite operation. A backup mark 2 is provided in step S111 at the end of the period T1 for file body writing process in step S4, and the backup mark is then cleared in step S52 at the end of the period T4 for the directory entry updating process in step S8.

The FS layer/application layer verification and restoration process in accordance with this technique is performed in accordance with a flowchart of FIG. 9.

In step S121, the recording and reproducing apparatus 1 determines whether any backup mark is present in each of the backup table App31 and the backup table FS32 on the backup memory 19 of FIG. 2.

The absence of the backup mark means that the data updating is normally completed with the backup mark cleared in step S52 of FIG. 8 with the writing of the file body of the moving image data completed (step S4) and the writing of the update information of the file system completed (steps S6 through S8). In such a case, the verification and restoration process of the FS layer and the application layer is not necessary. If no backup mark is present, the answer to the determination in step S121 is non-affirmative, and the FS layer/application layer verification and restoration process thus ends.

If any of the backup marks 1 and 2 is described in the backup table App31 and the backup table FS32, the answer to the determination in step S121 is affirmative, and processing proceeds to step S122.

In step S122, the recording and reproducing apparatus 1 determines whether the backup mark is a backup mark 1.

The backup mark 1 means that a power interruption may have taken place in the middle of the writing of the file body of the moving image data, namely, within the period T1 of FIG. 8. The file body needs to be restored by the application format controller 22 of FIG. 1. The FS layer is prior to updating and in a normally operating condition. The FS update difference information is backed up in a state immediately prior to the start of writing of the final RUV data. It is thus unnecessary to restore the FS from the update difference information of the FS layer. In the case of the backup mark 1, the answer to the determination in step S122 is affirmative, and step S127 and subsequent steps are performed in order to verify and restore the application layer.

Step S127 and subsequent steps, identical to step S94 and subsequent steps previously discussed, are not discussed herein.

If the backup mark is not a backup mark 1 but a backup mark 2, a power interruption may have taken place within the FS update period from T2 through T4 of FIG. 8. As previously discussed with reference to FIG. 7, the FS layer might be destroyed. In the case of the backup mark 2, the answer to the determination in step S122 is non-affirmative. In step S123, the recording and reproducing apparatus 1 determines whether the FS layer is normal.

If it is determined that the FS layer is normal, the answer to the determination in step S123 is affirmative to verify and restore the application layer. Steps S127 and subsequent steps are performed.

If it is determined that the FS layer is in an abnormal state, the answer to the determination in step S123 is non-affirmative. Processing proceeds to step S124.

The backup mark 2 means that a power interruption may have taken place in the middle of the writing of the update information of one of the FAT1, the FAT2 and the directory entry, namely, during the periods T2 to T4 with the file body of the moving image data updated. The FS layer might be destroyed in this case. The recording and reproducing apparatus 1 verifies the state of the FS layer in step S123. If the FS layer is found to be in an abnormal state, the answer to the determination in step S123 is non-affirmative. Processing proceeds to step S124.

In step S124, the recording and reproducing apparatus 1 restores the FAT1, the FAT2 and the directory entry on the areas 41-2, 41-3 and 41-4 on the hard disk 41 of FIG. 3 using the backup.

The backup here refers to update difference information of each of the FAT1, the FAT2 and the directory entry described in the backup table FS32 of the backup memory 19 of FIG. 2.

With reference to FIG. 9, in a manner different from the method of FIG. 7, the recording and reproducing apparatus 1 concurrently restores the FAT1, the FAT2 and the directory entry even if a power interruption takes place within the periods T3 and T4.

In step S125, the recording and reproducing apparatus 1 determines whether the FS layer has been restored.

If the FAT1 of the FS is successfully restored, the answer to the determination in step S125 is affirmative to verify and restore the application layer. Steps S127 and subsequent steps are performed.

If the correction of the FS layer fails, the answer to the determination in step S125 is non-affirmative. The recording and reproducing apparatus 1 determines a file system error and prompts the user to reformat. In step S126, the recording and reproducing apparatus 1 notifies a user of a data error for reformatting. The FS layer/application layer verification and restoration process is thus completed.

The backup marks 1 and 2 are used in the process illustrated in FIGS. 8 and 9. Even if a power interruption takes place in the FS layer update period of the periods T2 through T4, the FS layer is restored and an ineffective area (unused area invisible from the application layer) is not caused. The recording process of FIG. 8 has less process steps for providing the backup marks than the recording process of FIG. 6. The recording process is thus performed at higher speed.

The FS layer/application layer verification and restoration process of FIGS. 7 and 9 is performed from the occurrence of a power interruption in the middle of moving image recording to the restoration of power source. The execution timing of the FS layer/application layer verification and restoration process is not limited to the above-described timing.

Figure 10:
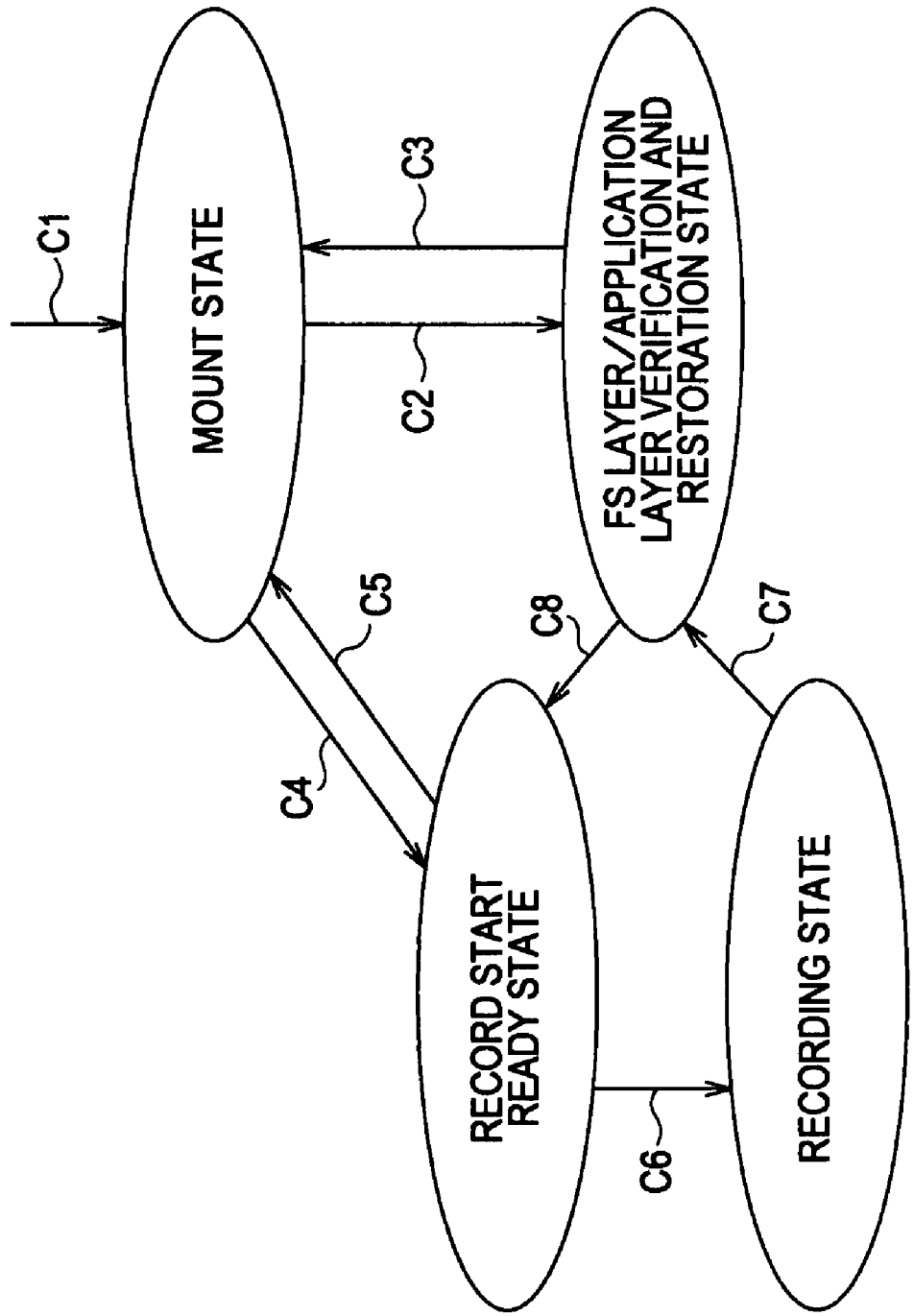
FIG. 10 is a state transition chart of states taken by the recording and reproducing apparatus of FIG. 1 in terms of recording operation.

Another execution timing of the FS layer/application layer verification and restoration process of FIGS. 7 and 9 is described below with reference to FIG. 10. FIG. 10 illustrates part of operational states taken by the recording and reproducing apparatus 1. The "part of the operational states" is illustrated because FIG. 10 illustrates the part of the operational states of the recording process. The recording and reproducing apparatus 1 performs not only a recording process of the moving image data but also a reproducing process. The recording and reproducing apparatus 1 can take the operational states for the reproducing process, but for simplicity of explanation, such states are omitted herein.

As shown in FIG. 10, each state, represented by an ellipse, is determined by a name inside the ellipse, such as "mount state." Transition from one state to another state is carried out if a predetermined condition is satisfied. Such a state transition condition is represented by an arrow-headed line tagged with label "C."

When the recording and reproducing apparatus 1 is switched on, i.e., power is on, the recording and reproducing apparatus 1 determines that state transition condition C1 is satisfied. The recording and reproducing apparatus 1 thus transitions to the mount state.

In the mount state, the recording and reproducing apparatus 1 checks each drive or recording medium, and then waits on standby.

If any fault is detected during checking of a predetermined recording medium, for example, if the FS of the hard disk 41 of FIG. 3 on the hard disk drive 16 of FIG. 1 cannot be read, the recording and reproducing apparatus 1 determines that a state transition condition C2 is satisfied. The recording and reproducing apparatus 1 then transitions from the mount state to an FS layer/application layer verification and restoration state.

The FS layer/application layer verification and restoration state refers to a state in which the FS layer/application layer verification and restoration process of FIG. 7 or 9 is in progress. If the state transition condition C2 is satisfied in FIG. 10, the FS layer/application layer verification and restoration process of FIG. 7 or 9 starts on a predetermined recording medium in fault.

The satisfaction of the state transition condition C2 functions as a trigger to start the FS layer/application layer verification and restoration process of FIG. 7 or 9. When the FS layer/application layer verification and restoration process is completed, the recording and reproducing apparatus 1 determines that a state transition condition C3 is satisfied. The recording and reproducing apparatus 1 transitions from the FS layer/application layer verification and restoration state to the mount state.

For example, the operation device 2 of FIG. 1 may select one from a "recording" operation, a "neutral" operation and a "reproducing" operation (not shown). When the operation device 2 switches to the "recording" operation, the recording and reproducing apparatus 1 determines that a state transition condition C4 is satisfied. The recording and reproducing apparatus 1 then transitions from the mount state to a record start ready state.

When the operation device 2 is operated to one of the "neutral" operation and the "reproducing" operation in the record start ready state, the recording and reproducing apparatus 1 determines that a state transition condition C5 is satisfied. The recording and reproducing apparatus 1 transitions from the record start ready state to the mount state.

The record start ready state refers to a standby state in which the recording process of FIG. 6 or 8 is ready to start. When the moving image record start command is issued from the operation device 2 of FIG. 1, the recording and reproducing apparatus 1 determines that a state transition condition C6 is satisfied. The recording and reproducing apparatus 1 transitions from the record start ready state to a recording state. In the recording state, the recording process of FIG. 6 or 8 is in progress. As shown in FIG. 10, if the state transition condition C6 is satisfied, the recording process of FIG. 6 or 8 starts.

When the recording process of FIG. 6 or 8 is completed, i.e., when the fclose operation in step S9 is performed, the recording and reproducing apparatus 1 determines that a state transition condition C7 is satisfied. The recording and reproducing apparatus 1 transitions from the recording state to the FS layer/application layer verification and restoration state. When the recording process completed in FIG. 10, the FS layer/application layer verification and restoration process of FIG. 7 or 9 starts. More specifically, even if the recording process is fully completed, the FS layer and the application layer are not necessarily 100 percent normal. To verify the normal state of the FS layer and the application layer, the FS layer/application layer verification and restoration process of FIG. 7 or 9 is carried out.

The satisfaction of the state transition condition C7 triggers the FS layer/application layer verification and restoration process of FIG. 7 or 9. When the process is completed, the recording and reproducing apparatus 1 determines a state transition condition C8 is satisfied. The recording and reproducing apparatus 1 transitions from the FS layer/application layer verification and restoration state to the recording start ready state.

When a power interruption occurs in the recording state followed by restoration of power, the state transition condition C1 is satisfied. The recording and reproducing apparatus 1 transitions to the mount state. The state transition condition C2 is then satisfied, and the recording and reproducing apparatus 1 transitions to the FS layer/application layer verification and restoration state. The FS layer/application layer verification and restoration process of FIG. 7 or 9 is initiated on the recording medium that was recording in the event of the power interruption.

In the above discussion, the unit of the file body data managed by the application, namely, a minimum recording unit of moving image data in the application format is 1 RUV. The unit is not limited 1 RUV. The unit may be VOBU. The unit of 1 RUV is preferable because restoration by RUV contained in search information requires no reconstruction of the search information. The restoration process of FIG. 7 or 9 is thus easy as the application format.

More specifically, if 1 RUV is 1 GOP, regeneration of search data is not necessary. If data length is modified by a plurality of GOPs or VOBU, VOBU_TABLE containing the search data needs to be regenerated. With this process, the encode/decode unit 13 has heavy and complex workload. As a result, process time is prolonged. In the case of high quality (HQ) mode photographing, the upper limit of stream data rate of audio and video of 1 GOP (about 0.5 second) is 10.08 Mbps, and 1 RUV is composed of 10 VOBUs and has a length of 5 seconds. In variable bit rate (VBR) encoding, the upper limit of 1 RUV is 320 packs, 740 KB and 1480 sectors in any photographing target. When one cluster of the FAT is 32 KB, up to 24 clusters (precisely 23.125 clusters) are used. If power interruptions are repeated within intervals smaller than this, at FS update timings, for example, unused areas invisible to the application format increase in number. Since the recording process of FIG. 6 or 8 is performed in accordance with the present embodiment, i.e., the backup marks 2-0 through 2-2 and the backup mark 2 are attached, the FS can be restored. As a result, no unused areas are caused, and each file is prevented from being destroyed in terms of the FAT.

As shown in FIG. 2, the FS update difference information is backed up on the backup memory 19 (FIG. 1) each time the file body of 1 RUV is recorded on the recording medium (such as the hard disk 41 of FIG. 3) in the recording process of one file (i.e., every 5 second, for example). When the photographing operation ends, i.e., when the moving image record end command is issued as shown in FIG. 3, the FS is updated on the recording medium.

Since the update difference information of the FS to be backed up in this case is difference information as its name suggests, the data size is as relatively small as twice 2 KB, namely, 4 KB. For example, if the capacity of the backup table FS32 (FIG. 2) storing the FS update difference information is 2 KB, FS update difference information may overwrite previous information, i.e., may be backed up every recording of 1 RUV. Even with such an arrangement, the writing cycles of a flash memory becomes high if the backup memory 19 is constructed of the flash memory. The upper limit to the writing cycles (typically 100,000 cycles) can reach the cycle life early.

The update difference information of all RUVs in the middle of the recording process, namely, the update difference information of the application format is backed up on the backup memory 19. When the file recording ends in power interruption, a moving image photographed and recorded image can be adjusted to any length by RUV when the application format is completed. In this case, the FS update difference information is preferably stored by RUV. Given the longest FAT recorded file of 2 GB, the backup table FS32 (FIG. 2) storing the FS update difference information of all RUVs has the size described below. Since 1 RUV of 5 seconds has a size less than 24 clusters and of 740 KB or less, the file of the 2 GB long includes 2639 RUVs or more. If the FS update difference information of 4 KB per RUV is successively stored on the backup table FS32 without deletion, the capacity of the backup table FS32 becomes 10.3 MB at maximum when the moving image file reaches 2 GB recording size.

The following FS updating technique may be used in view of balance between the write cycle life and the capacity of the backup memory 19, namely, in view of more efficient backup.

One sector of a large-volume flash memory is typically 64 KB. In one FS update technique, the size of an area of the backup memory 19 assigned to the backup table FS32 is a data size equal to an integer multiple of one sector, and all the FS update difference information is accumulated by RUV on the backup table FS32 without deletion (without overwriting). The FS is updated on the recording medium when the FS update difference information of a predetermined number of RUVs falling within the data size equal to or lower than the integer multiple of one sector is stored. Steps S6 through S8 of FIG. 3 are performed. After the backup table FS32 is cleared, file recording continues. In the discussion of FIG. 3, step S4 of FIG. 3 includes a series of process steps until all RUVs as the file body data is recorded on the recording medium (hard disk 41 of FIG. 3) prior to the issue of the moving record end command. Step S4 in this proposed FS update technique includes a series of process steps until a predetermined number RUVs falling within the data size of the integer multiple of one sector is recorded on the recording medium. In other words, this FS update technique is based on a unit of the predetermined number of RUVs falling within the data size of the integer multiple of one sector, and steps S4 through S8 are repeated by unit.

The unit for acquiring a difference between FS's is RUV in the above discussion. More generally, the unit is L (an integer equal to or greater than 1) times the least common multiple of a minimum unit handled by the application format for a variety of types such as types of recording media and types of FS (also referred to as a minimum unit of application format or simply a minimum unit of FS) and a minimum recording unit of an audio-visual compression stream standard as application format standard (also referred to as minimum recording unit of moving image data in the application format).

More in detail, the minimum unit of the application format based on the FS and the minimum recording unit of the audio-visual compression stream standard do not always match each other. The minimum unit and the minimum recording unit are thus aligned to the least common multiple. Files are generated and recorded by the aligned unit.

For example, the minimum recording unit on a recording medium of the application format standard, namely, a minimum unit of the application format based on the FS is one sector of 512 bytes in the FS on the hard disk drive 16 or the memory as the recording medium. However, as described above, an integer multiple of 32 KB 1 ECC being a set of integer multiples of 512 bytes may be used as a minimum unit of the application format based on the FS in view of the versatility of each file on the recording medium.

The minimum recording unit of the audio-visual compression stream standard is now described. The standard definition (SD) audio-visual compression stream standard defines MPEG-PS (program stream) stream. The minimum recording unit is an integer multiple of 2 KB pack. The minimum recording unit of the audio-visual continuous stream data is an integer multiple of minimum data unit, namely, 1 VOBU (video object unit) containing 1 GOP of MPEG being variable length compression data size of 0.5 second.

An H264/AVC MPEG-TS stream is defined as an HD audio-visual compression stream. 188 bytes plus several bytes of synchronization data are defined as a minimum data unit. For example, in the preceding embodiment, the minimum recording unit of audio-visual continuous stream data is an integer multiple of the minimum data unit of 192 bytes as one pack, namely, a 0.5 second variable length compression data size of 1 VOBU (video object unit) containing MPEG 1 GOP.

The recording unit of file in the SD MPEG-PS stream is an integer multiple of 32 KB unit which is an integer multiple of 32 KB and the least common multiple. In the case of high-definition (HD) video H264/AVC MPEG-TS stream, the minimum unit is an integer multiple of 192 KB unit. The 192 KB unit is the least common multiple of 6 KB, which is the least common multiple of 192 bytes and 512 bytes, and an integer multiple of 32 KB. The recording unit is 1 RUV, for example.

The SD audio-visual MPEG-PS stream has a unit 2 KB pack containing system clock reference (SCR) therewithin. An error correction coding (ECC) unit is composed of 32 KB which is an integer multiple of one packs. Such an EEC unit is the minimum recording unit in the audio-visual compression stream standard. One sector 512 bytes of the FS on the medium is the minimum unit of the application format based on the FS. An integer of the least common multiple of 512 bytes and the EEC 32 KB is the recording unit of a record file. By recording the file in alignment with this recording unit (alignment process), 1 RUV size is achieved.

In the HD video H264/AVC MPEG-TS stream, video compression MPEG-TS has, as a basic packet, one packet of 188 KB of H264/AVC defined in AVCHD or Blu-Ray standards plus synchronization data 4 bytes. The size of the basic packet, namely, 192 bytes become the minimum recording unit of the audio-visual compression stream standard. The least common multiple of 192 KB and 512 bytes of one FS medium sector is 6 KB. An integer multiple of the least common multiple of 6 KB and ECC 32 KB size versatile on media in the application format becomes the recording unit of the record file. By recording the file in alignment with this recording unit (alignment process), 1 RUV is achieved.

In accordance with the application format standard, each of the SD audio-visual compression stream and the HD audio-visual compression stream is generated by RUV on a buffer memory and then written on a recording medium rather than being generated in infinite length on the buffer memory and then written on the recording medium. When a compression stream of a predetermined size, for example, of several MB to tens of MB is accumulated on the buffer memory, the compression stream is then written on the recording medium by RUV (video recording unit) while a currently photographed stream is accumulated in parallel as another RUV. In this way, RUV is determined not by length of time but by data size.

In the above-described embodiments, the RUV is used as a unit for acquiring the FS difference.

General process for backing up the FS and controlling the writing of the FS is described below.

Figure 11:
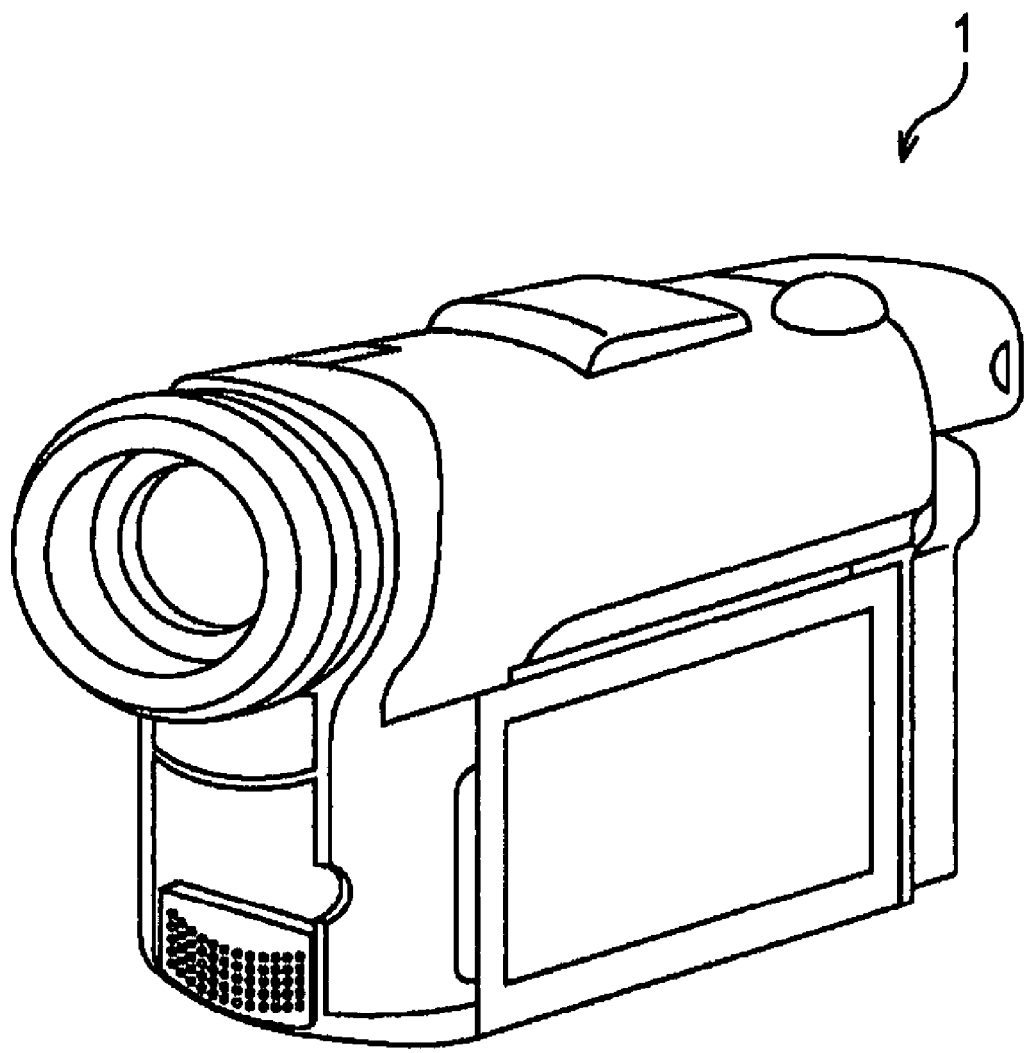
FIG. 11 is an external view of the recording and reproducing apparatus of FIG. 1 implemented as a video camera.

In the discussion that follows, the recording and reproducing apparatus 1 of FIG. 1 is a video camera shown in FIG. 11.

The recording and reproducing apparatus 1 performs an SD moving image recording operation, an HD moving image recording operation, and a still image recording operation.

The SD moving image recording operation, the HD moving image recording operation and the still image recording operation may be performed in accordance with the application format of moving image stream data or still image stream data.

The application format of HD moving image recording uses a transport stream having, as a basic packet, one packet of 188 KB of H264/AVC defined in AVCHD or Blu-Ray standards plus synchronization data 4 bytes.

The application format of SD moving image recording uses a program stream having as basic pack data a 2 KB pack containing system clock reference (SCR) therewithin, such as MPEG2-PS. In accordance with such an application format, XP, HQ+, HQ, Sp, and LP recording modes representing video compression rate, namely, recording video quality, and aspect ratio of the video can be selected and set. As a result, ordinary or maximum recording data rate different from compression video data to compression video data is thus provided.

The ordinary or maximum recording data rate is specified in design specifications of a compression video recording and reproducing apparatus (recording and reproducing apparatus 1). The design specifications become different from subject to subject. The design specifications may be intended to record video of a scene of activity at ordinary home or video of fineness of nature scene for an ordinary recording time. Furthermore, the design specifications may be intended to record repeated short recording sessions over a maximum recording time. For example, a user might photograph and record, in short-time but numerous sessions, small images of humans quickly moving around in a sporting event or under special working surroundings.

In the still image recording operation, a design rule for camera file system (DCF) still image is recorded. The DCF is standardized as a standard image file of digital camera by Japan Electronics and Information Technology Industries Association (JEITA). Specifications of Exchangeable Image File Format (Exif) are standardized by JEITA, and JPEG supporting Excif is DCF.

The DCF still image herein is an image photographed by the recording and reproducing apparatus 1 that functions as a digital camera. The image data is JPEG compressed and recorded. In accordance with Excif, photographing information such as date and photographing location are attached to the image data as additional information to the image. The resulting image data is stored on the recording medium (such as the hard disk drive 16 or the removable medium 5) as a DCF image file. Not only the recording and reproducing apparatus 1 but also most of currently available digital still image cameras support DCF.

The application format of still image recording is an application format of the still image DCF. In accordance with the still image DCF application format, the recording and reproducing apparatus 1 sets photograph image pixel size based on the photographing specifications thereof. The photograph image pixel size refers to an image pixel size of an image in a vertical and horizontal direction. For example, a still image photograph resolution selection function allows a user to select one from 4 M, 3 M wide aspect, 1.9 M, and VGA (0.3M). If the recording and reproducing apparatus 1 includes a complementary metal oxide semiconductor (CMOS) image pickup device, a 2.3 M wide aspect still image is available as a still image that can be photographed concurrently with a moving image. Available as a still image that can be concurrently with a 4:3 moving image is 1.7 M still image (4:3 standard aspect ratio).

Figure 12:
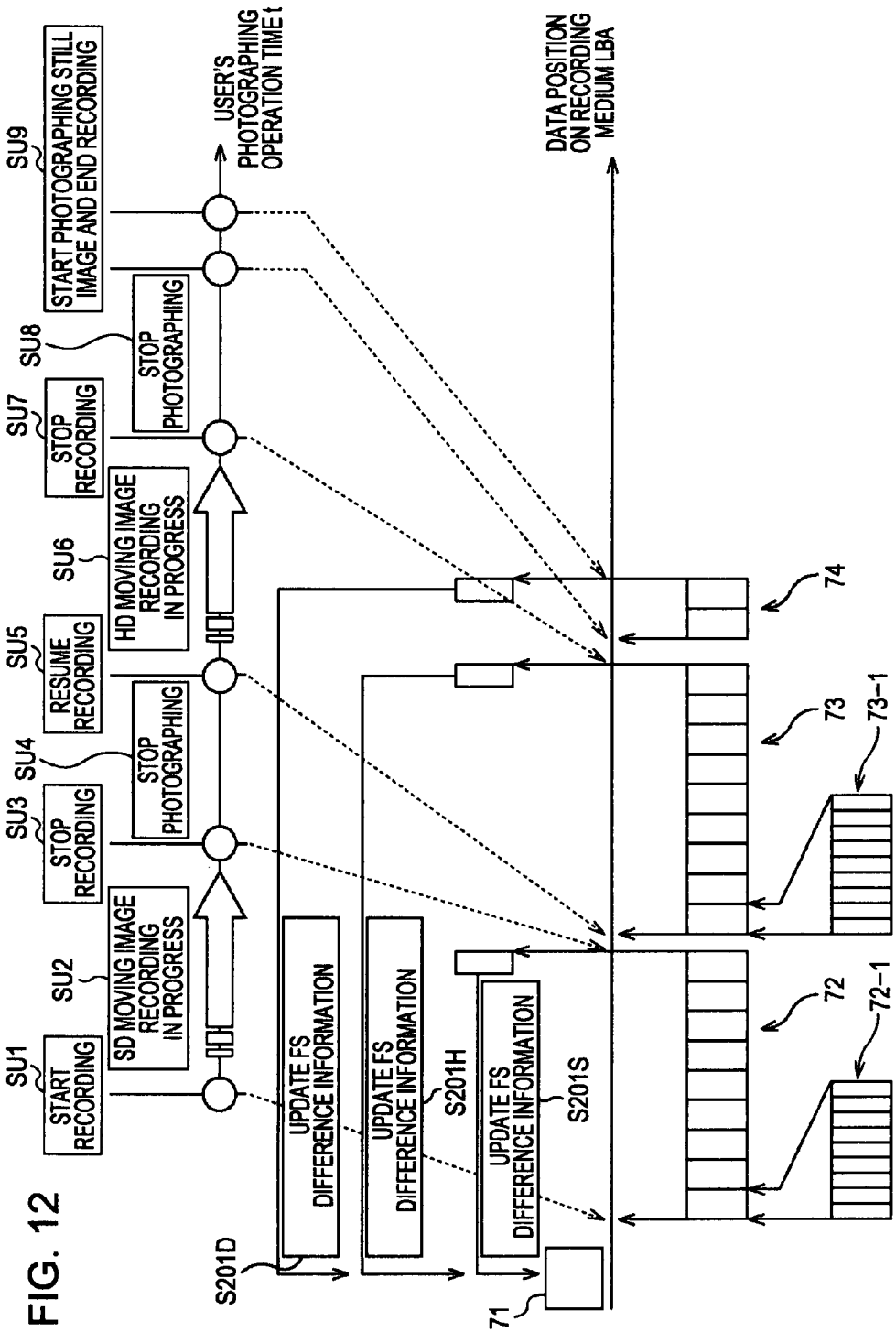
FIG. 12 illustrates an entire process of the recording and reproducing apparatus of FIG. 1 performing FS backup and write control.

As shown in a timing diagram on the top portion of FIG. 12, the user operation is now considered. Step SU1, the user starts the SD moving image recording operation. In step SU2, the user causes the SD moving image recording operation to proceed (for example, in MPEG2 program stream). In step SU3, the user stops the SD moving image recording operation. After a photograph stop period in step SU4, the user starts the HD moving image recording operation in step SU5. In step SU6, the user causes the HD moving image recording operation to proceed (for example, in MPEG4 transport stream in AVCHD format). In step SU7, the user stops the HD moving image recording operation. Subsequent to a photograph stop period in step SU8, the user starts photographing a DCF still image and completes recording in step SU9. More specifically, the recording and reproducing apparatus 1 is in the still image mode in step SU9. When the user presses a shutter button (not shown), the recording and reproducing apparatus 1 starts photographing a still image, and writes the still image in a file on the recording medium (such as the hard disk drive 16 or the removable medium 5). Upon completion of the writing, the recording and reproducing apparatus 1 ends the still image recording process.

FIG. 12 illustrates locations where the data of the SD moving image, the HD moving image and the DCF still image are written through the user operations of steps SU1 through SU9, namely, illustrates data positions on the recording medium (such as the hard disk drive 16 or the removable medium 5). As shown in FIG. 12, logical block addressing (LBA) values increase in the direction of the arrow-headed line.

A FAT portion of the FS management information is written on an area 71 having a small LBA addressing value as a data position on the recording medium. Difference information of registration update of the FAT portion of the FS management information is backed up on the backup memory 19 of FIG. 1 as the FS update difference information.

The backup timing of the FS update difference information to the backup memory 19 is described below. 1 RUV data size is the data size that is an integer multiple of the least common multiple of the minimum recording unit of the audio-visual compression stream standard and the minimum unit of the application format of the FS (FS minimum unit). Record data is recorded by RUV. Data of an integer multiple of RUVs (including RUV) is recorded on the recording medium while the FS update difference information is backed up on the backup memory 19 at the same time.

As shown in FIG. 12, an SD moving image stream file is recorded by RUV on an area 72 of the recording medium. Each time an integer multiple of RUV is recorded, the FS update difference information is backed up on the backup memory 19. Data of 1 RUV is successively recorded on each of rectangles forming the area 72.

As shown in FIG. 12, an HD moving image stream file is recorded by 1 RUV on an area 73 of the recording medium. Each time data of an integer multiple of 1 RUV is recorded, the FS update difference information is backed on the backup memory 19. Data of 1 RUV is successively stored on each of rectangles forming the area 73.

The internal structure of the RUV of each of the SD moving image stream file and the HD moving stream file is described below.

The internal structure of the RUV of the SD moving image stream file is described below. The SD moving image stream file contains a compression video MPEG-PS having SCR continuous time information therewithin and a unit of 1 pack of 2 KB. The ECC unit is composed of 32 KB, namely, an integer multiple of one pack. The ECC unit is the minimum recording unit of the audio-visual compression stream standard. The minimum unit of the application format of the FS is one sector of 512 bytes on the FS medium. An integer multiple of the least common multiple of 512 bytes and ECC 32 KB becomes the recording unit of the record file. By recording the file in alignment with this recording unit (alignment process), 1 RUV is achieved. As shown in FIG. 12, the least common multiple of 512 bytes and ECC 32 KB corresponds to one of a plurality of small partitions of an area 72-1 of the area 72 having the front RUV recorded thereon.

The internal structure of the RUV of the SD moving image stream file is described. In the HD video H264/AVC MPEG-TS stream, video compression MPEG-TS has, as a basic packet, one packet of 188 KB of H264/AVC defined in AVCHD or Blu-Ray standards plus synchronization data 4 bytes. The size of the basic packet, namely, 192 bytes become the minimum recording unit of the audio-visual compression stream standard. The least common multiple of 192 KB and 512 bytes of one FS medium sector is 6 KB. An integer multiple of the least common multiple of 6 KB and ECC 32 KB size versatile on media in the application format becomes the recording unit of the record file. By recording the file in alignment with this recording unit (alignment process), 1 RUV is achieved. As shown in FIG. 12, the least common multiple of 6 KB and ECC 32 KB corresponds to one of a plurality of small partitions of an area 73-1 of the area 73 having the front RUV recorded thereon.

The frequency of the backup of the FS update difference information to the backup memory 19 with SD and HS moving image being recorded is considered.

When the SD and HD moving image recording is in progress, the backup mark is set on the backup memory 19. The FS update difference information generated each time a predetermined RUV or a plurality of RUVs is recorded on the recording medium is successively backed up.

The recording time of the HD moving image of 1 RUV at the XP image quality is about 5 seconds. If each RUV is backed up each time the HD moving image is stored, the backup frequency is too high. Backing up every 10 to 20 seconds, namely, one backup cycle every 2 through 4 RUVs appears appropriate.

The recording of the HD moving image of 1 RUV at the LP image quality is about 30 seconds. If backup is performed each time a plurality of RUVs is recorded, there is a risk that data recorded before is lost (however, data destruction occurring during the FS writing at the FS update timing is rare). Backup operation each time one RUV is recorded appears appropriate.

The same is true of another quality HD moving images and the SD moving images. The backup frequency may be set in response to the recording time of 1 RUV.

Any particular compression size unit is not specified in the still image. In view of the versatility of the recording media, an integer multiple of ECC 32 KB is a recording unit of the record file. Record data is thus aligned with the recording unit (in alignment process) and then recorded on the recording medium. In other words, a set of recording data units becomes a DCF still image file. As shown in FIG. 12, the DCF still image file is recorded on an area 74 by recording unit. Each time an integer multiple of recording data units is recorded, i.e., each time a recording data unit is recorded on one of a plurality rectangular partitions of the area 74, the FS update difference information is backed up on the backup memory 19.

A record start operation and a record end operation is activated only the user presses a shutter button. The backup of the FS update difference information of the still image is thus preferably performed each time one recording data unit is recorded.

The FS update difference information is successively backed up on the backup memory 19 during the SD recording operation, the HD recording operation, and the still image recording operation. The updating process of the stream file registration information of the FS management information (FS update difference information updating process of FIG. 12) is performed using the FS update difference information finally backed up at the end of recording. As shown in FIG.

12, the FS update difference information updating process is performed in step S201S subsequent to the completion of the recording of the SD moving image with record stop operation performed in step SU3. When the recording of the HD moving image is completed with the record stop operation performed in step SU7, the FS update difference information updating process is performed in step S201H. When the photograph start operation of the still image and the record end operation are performed in step SU9, i.e., when the recording of the still image is completed subsequent to the user's pressing of the shutter button, the FS update difference information updating process is performed in step S201D.

The backup of the FS in an editing (deletion) process is described below.

The recording and reproducing apparatus 1, constructed of the camera-cum-video player of FIG. 11, records a file group with one chapter being one file. The recording and reproducing apparatus 1 performs a variety of editing operations. For example, the recording and reproducing apparatus 1 selects one chapter or a plurality of chapters for deletion, deletes all chapters recorded in a selection application format, or moves, deletes, all deletes data specified on a playlist.

The editing operations are divided into an original editing process and a playlist editing process in accordance with the present embodiment.

In accordance with the original editing process, a stream file of a moving chapter and an application management information file managing the file are updated and modified. In accordance with the playlist editing process, registration list information of the application management information file is updated and modified without modifying the stream file of the moving chapter.

One moving image stream file is registered in the application format, thereby becoming a moving image chapter. This chapter is referred to as an original chapter in the editing operation.

The information management file in the application format has a function of editing a reproducing order by registering or deleting each moving chapter in a playlist, and a function of reproducing the moving image chapters in the reproducing order registered in the playlist. Such a file is referred to as a playlist (or PL) in the editing function specifications.

A file internal area to store PL editing function information is reserved. The PL is stored on the recording medium together reserved area of the PL editing function information. As shown in FIGS. 13 through 17, the PL is recorded on an area 81. The registration of the editing process is performed by adding to the PL a chapter information file that is automatically generated and attached to each chapter by the application format during photographing (registration to the PL), deleting the chapter information file from the PL (deleting the registration from the PL), moving the chapter information file from the PL (reorganizing the registration order), and all deleting the chapter information file from the PL (initializing the registration list of the PL).

FIGS. 13 through 17 illustrate the backup operation of the FS performed when the original chapter is selected and deleted as one of the original editing processes.

Figure 13:
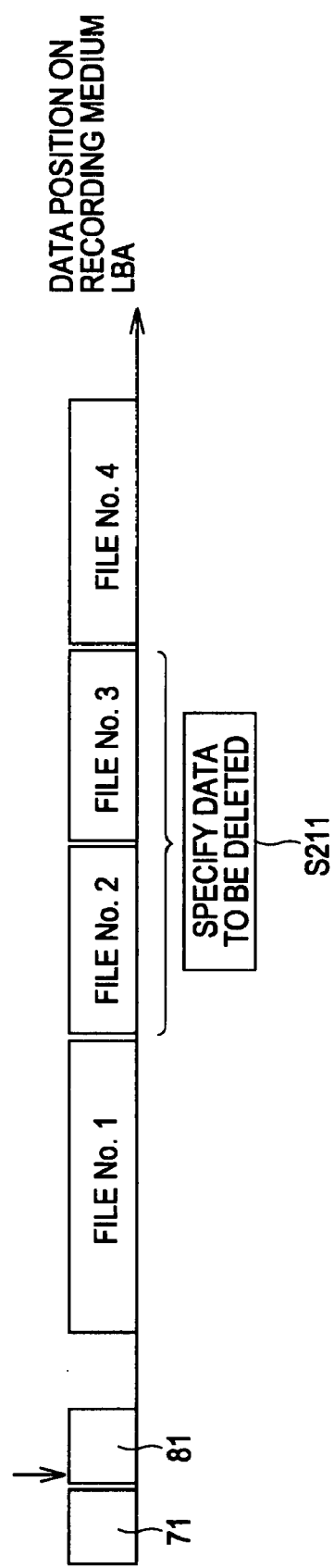
FIG. 13 illustrates the FS backup process in which an original chapter is selected or deleted during editing.

FIG. 13 illustrates the original chapter prior to selection and deletion. In the state of FIG. 13, the application format controller 22 of FIG. 1 designates a moving image stream file as an original chapter as data to be deleted from the recording medium. As shown in FIG. 13, a file No. 2 as a chapter 2 and a file No. 3 as a chapter 3 are designated as the data to be deleted in step S211.

Figure 14:
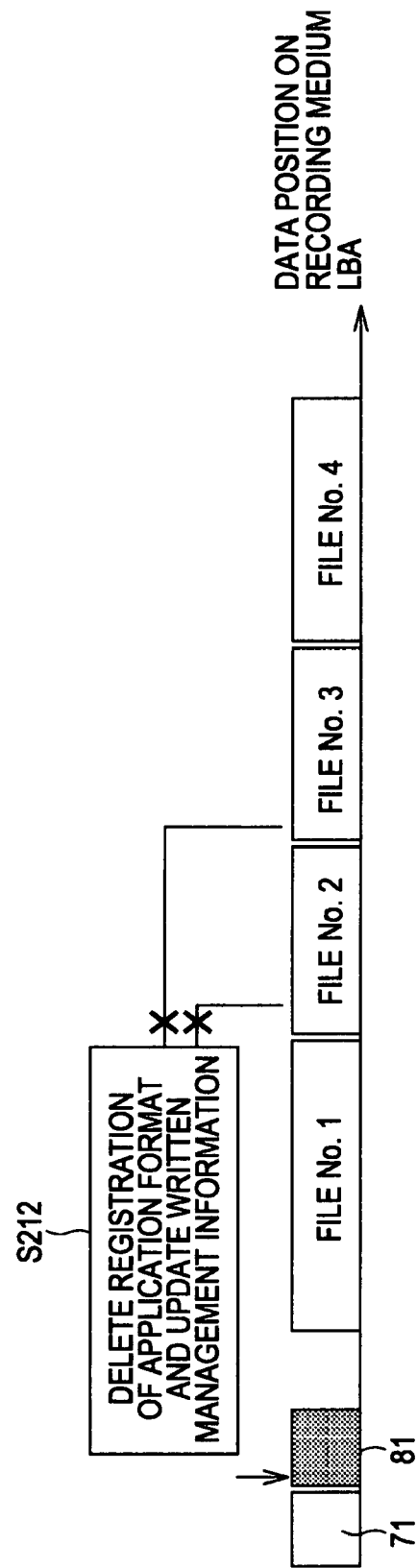
FIG. 14 illustrates the FS backup process in which an original chapter is selected or deleted during editing.

FIG. 14 illustrates the application format in the updated state thereof. In step S212, the application format controller 22 deletes registration (entry) of application format registration management on the area 81 for the file No. 2 as the chapter 2 and the file No. 3 as the chapter 3. More specifically, the entry of the file No. 2 as the chapter 2 and the file No. 3 as the chapter 3 is deleted from the PL. During step S212, the application format controller 22 updates management information.

Figure 15:
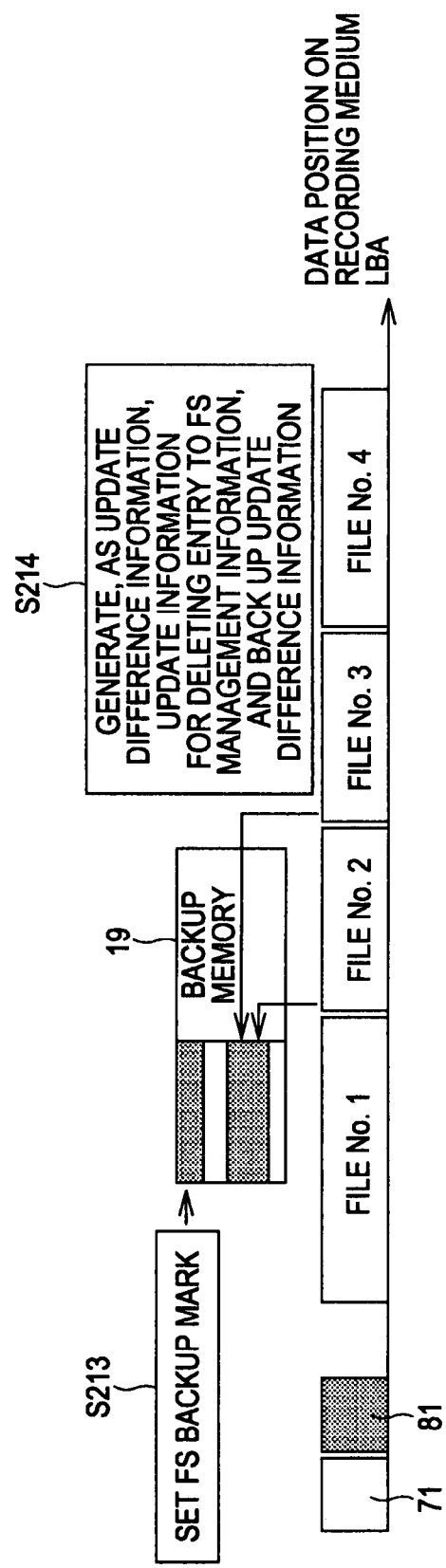
FIG. 15 illustrates the FS backup process in which an original chapter is selected or deleted during editing.

FIG. 15 illustrates the registration of the FS prior to deletion. When the registration management information of the application format of FIG. 14 (PL portion) is completed, processing proceeds to a step to delete file registration of the FS. More specifically, in step S213, an FS backup mark is set in an area assigned to FS backup on the backup memory 19 (such as the backup table FS32 of FIG. 2). The deletion operation of the registration of the FS management information thus starts. In step S214, update information for deleting the registration (entry) of the FS management information for each of the file No. 2 and the file No. 3 is generated as the FS update difference information. The update information is thus backed up on the area assigned to FS backup on the backup memory 19 (such as the backup table FS32 of FIG. 2).

Figure 16:
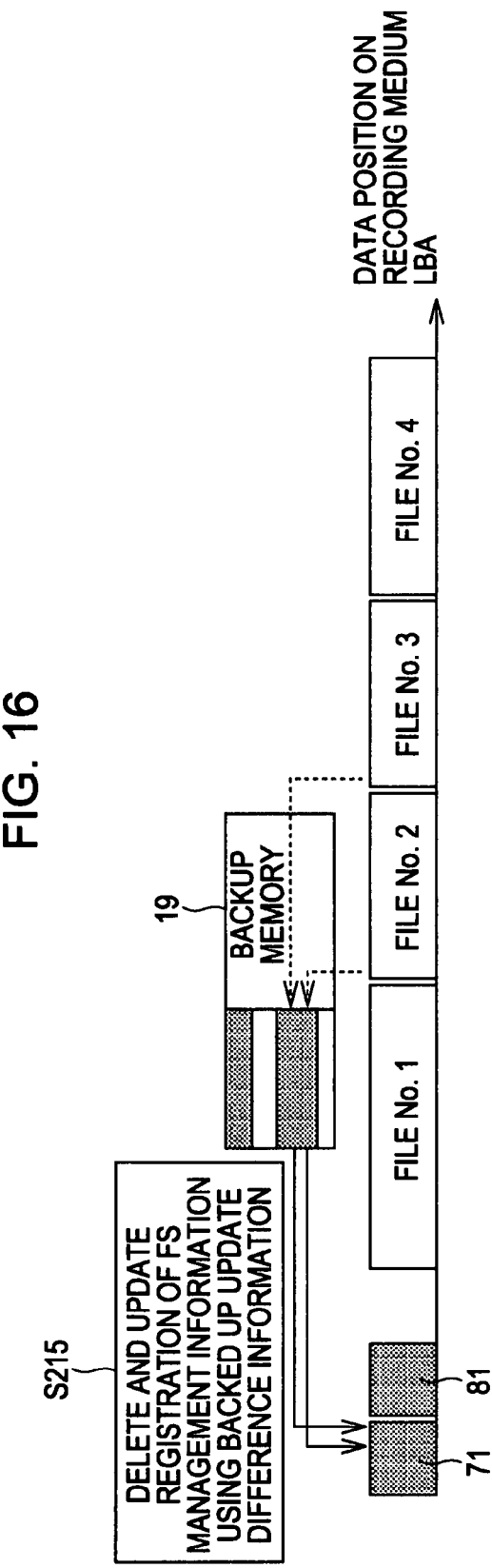
FIG. 16 illustrates the FS backup process in which an original chapter is selected or deleted during editing.

FIG. 16 illustrates the registration of the FS being deleted. When the backup of the FS update difference information is completed on the backup memory 19, updating of the FS management information on the area 71 on the recording medium starts. As shown in FIG. 16, in step S215, the registration of the FS management information is deleted and updated using the FS update difference information backed up on the backup memory 19. The registration of the FS management information to be deleted is the entry of the FS management information of the file No. 2 and the file No. 3. More specifically, the FS update difference information is written for updating on an FAT portion and a directory entry portion of the FS management information.

A power interruption might take place on the recording and reproducing apparatus 1 under this condition. The recording and reproducing apparatus 1 determines that the FS backup mark is set on the backup memory 19. The recording and reproducing apparatus 1 reads the FS update difference information from the backup memory 19 and then writes the read FS update difference information on the FAT portion and the directory entry portion of the FS management information. Even if a power interruption takes place in middle of the writing of the FS management information, the FS management information is restored from the FS update difference information backed up on the backup memory 19. The FS, which has been destroyed due to the power interruption, can thus be restored.

Figure 17:
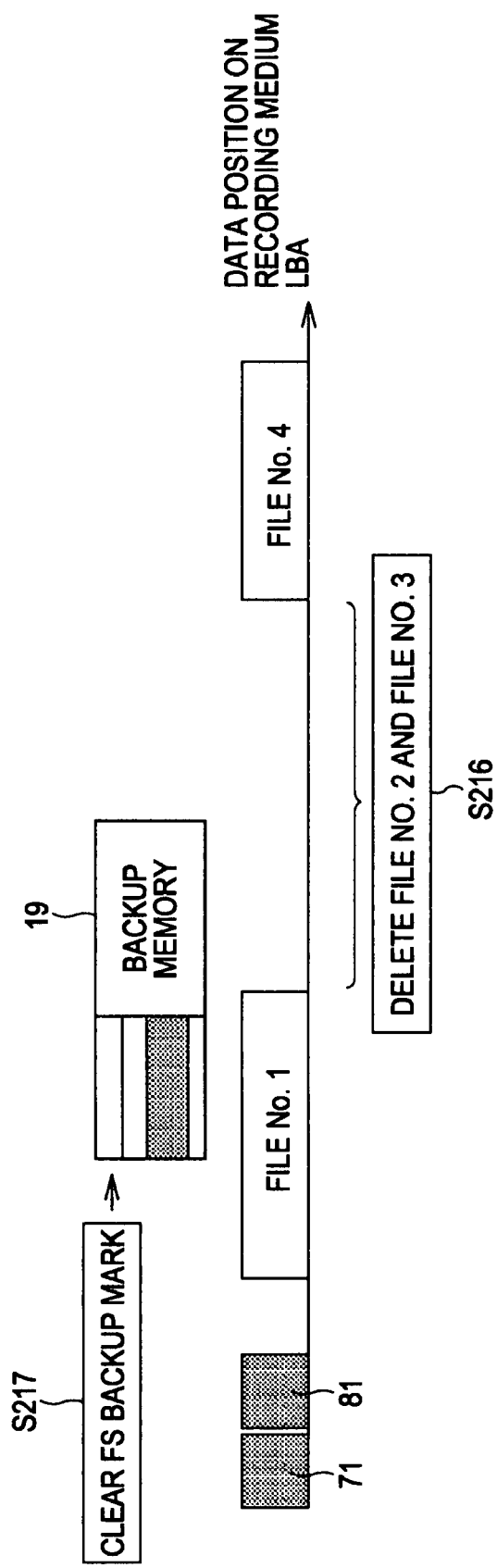
FIG. 17 illustrates the FS backup process in which an original chapter is selected or deleted during editing.

FIG. 17 illustrates a process from the registration of the FS management information to the completion of the deletion. As shown in FIG. 17, the registration (entry) of the FS management information of the file No. 2 and the file No. 3 is completed. In step S216, the file No. 2 and the file No. 3 are deleted. In step S217, the FS backup mark is cleared on the backup memory 19. The deletion process of the entry of the file from the FS management information is thus completed.

Through steps S211 through S217 of FIGS. 13 through 17, the writing of the FS management information for updating is performed on the recording medium using the FS update difference information to delete the registration of the FS management information. Even if a power interruption takes place in the middle of updating, the writing and reading on the backup storage area on the backup memory 19 are controlled. The FS, which has been destroyed due to the power interruption, is restored through the control process.

In the deletion and updating of the playlist, a real file is not deleted and size modification is not performed. Registration of information management file (PL) to an internally reserved area on the area 81 and registration order of the PL is modified. The editing process including editing of the PL chapter registration, selection and deletion of the PL chapter, selection and movement of the PL chapter, and all deletion of the PL chapter is performed by updating the information on the area 81 on the recording medium. The FS is thus free from destruction due to updating.

The FS backup mark commonly used in IFS backup control in the formation initialization of the recording medium is described below. More specifically, setting and clearance of the FS backup mark are also performed in the application format initialization of the recording medium.

Figure 18:
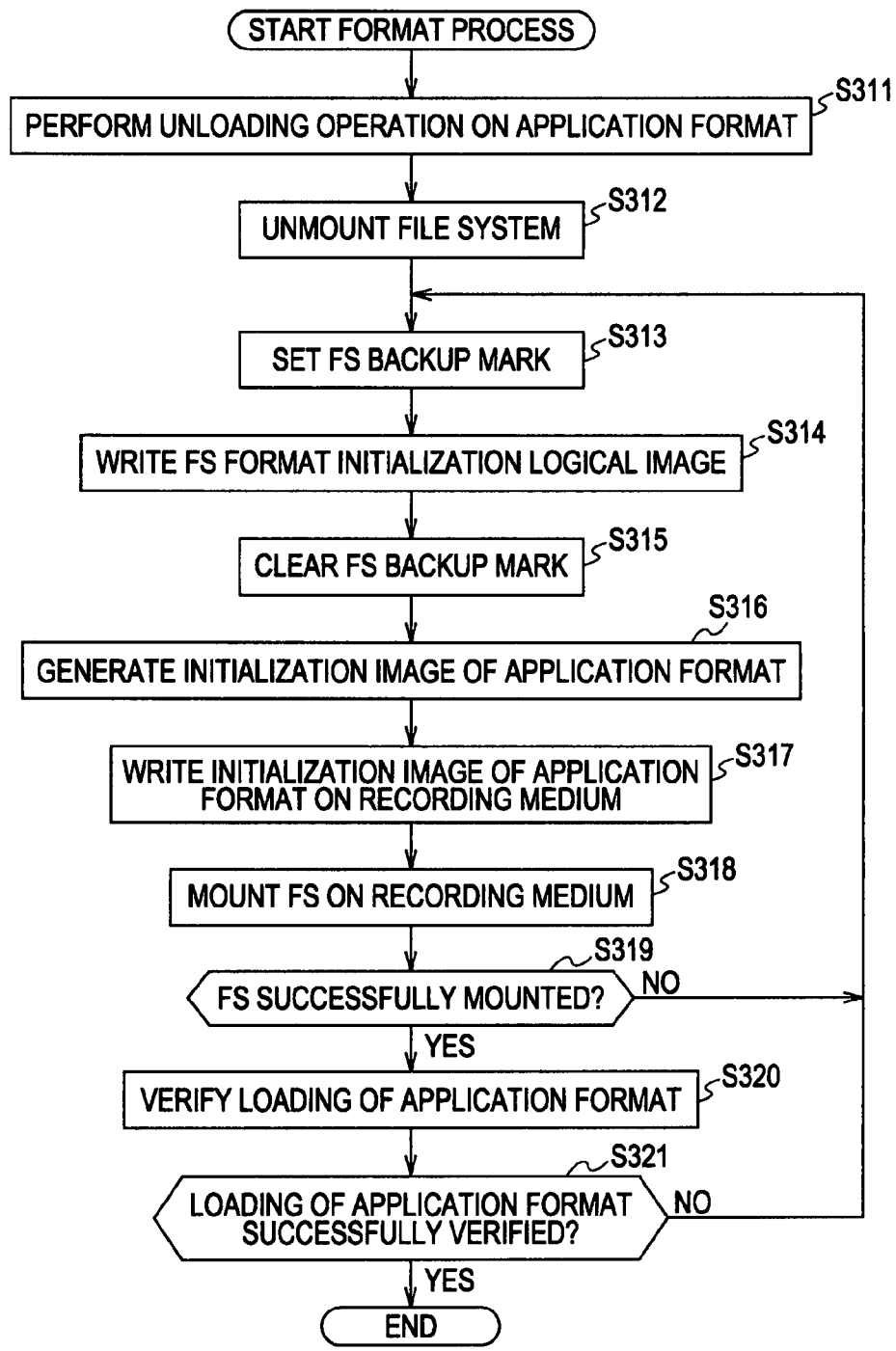
FIG. 18 is a flowchart illustrating a formatting process in accordance with one embodiment of the present invention.

FIG. 18 illustrates a format process.

In step S311, the recording and reproducing apparatus 1 performs an unloading operation in the application format. The unloading operation refers to unloading control of application format management information from control management load of the system and quitting the application format management.

In step S312, the recording and reproducing apparatus 1 unmounts a file system. The mounting of the file system means causing a state in which information processing interface for write and read control is managed with the FS management information of a drive volume placed on drive hardware recognition information. The word "unmounts" means causing that state to end.

In step S313, the recording and reproducing apparatus 1 sets the FS backup mark on the backup memory 19.

In step S314, the recording and reproducing apparatus 1 writes a format initialization logical image of the FS.

More specifically, the format initialization process of the FS (format initialization logical image write process) starts subsequent to the setting of the FS backup mark. In the format initialization process of the FS, a physical format process is first performed on the recording medium and a logical format process of the FS is then performed. One of a quick format and a full format is performed. In the quick format, data is written on only an FS management portion and in the full format, user data is written on the entire surface of the recording medium.

Figure 19:
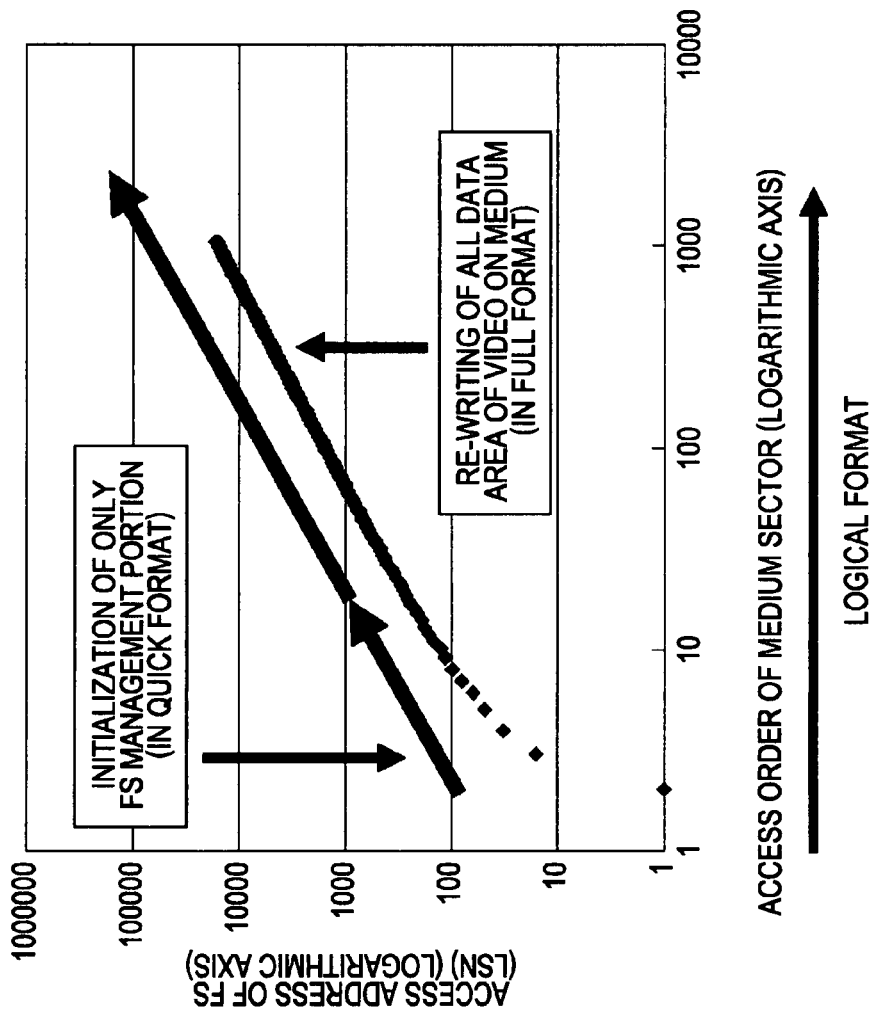
FIG. 19 illustrates a relationship between an FS access address and an access order of a medium sector in each of a quick format and a full format.

FIG. 19 illustrates relationship between FS access address and access order of a media sector in each of the quick format and the full format.

Returning to FIG. 18, in step S315, the recording and reproducing apparatus 1 clears the FS backup mark on the backup memory 19.

In step S316, the recording and reproducing apparatus 1 generates an initialization image of the application format. In step S317, the initialization image of the application format is written on the recording medium. The format initialization process of the recording medium is thus completed.

In step S318, the recording and reproducing apparatus 1 mounts the FS on the recording medium.

In step S319, the recording and reproducing apparatus 1 determines whether the FS has been successfully mounted.

If the mounting of the FS fails, the answer to the determination in step S319 is non-affirmative. Processing returns to step S313 to repeat step S313 and subsequent steps.

If the FS has been successfully mounted, the answer to the determination in step S319 is affirmative, processing proceeds to step S320.

In step S320, the recording and reproducing apparatus 1 verifies the loading of the application format.

In step S321, the recording and reproducing apparatus 1 determines whether the loading of the application format has been verified successful.

If the load of the application format has been unsuccessful, the answer to the determination in step S321 is non-affirmative. Processing returns to step S313 to repeat step S313 and subsequent steps.

If the load of the application format has been successful, the answer to the determination in step S321 is affirmative. The entire format process ends.

Figure 20:
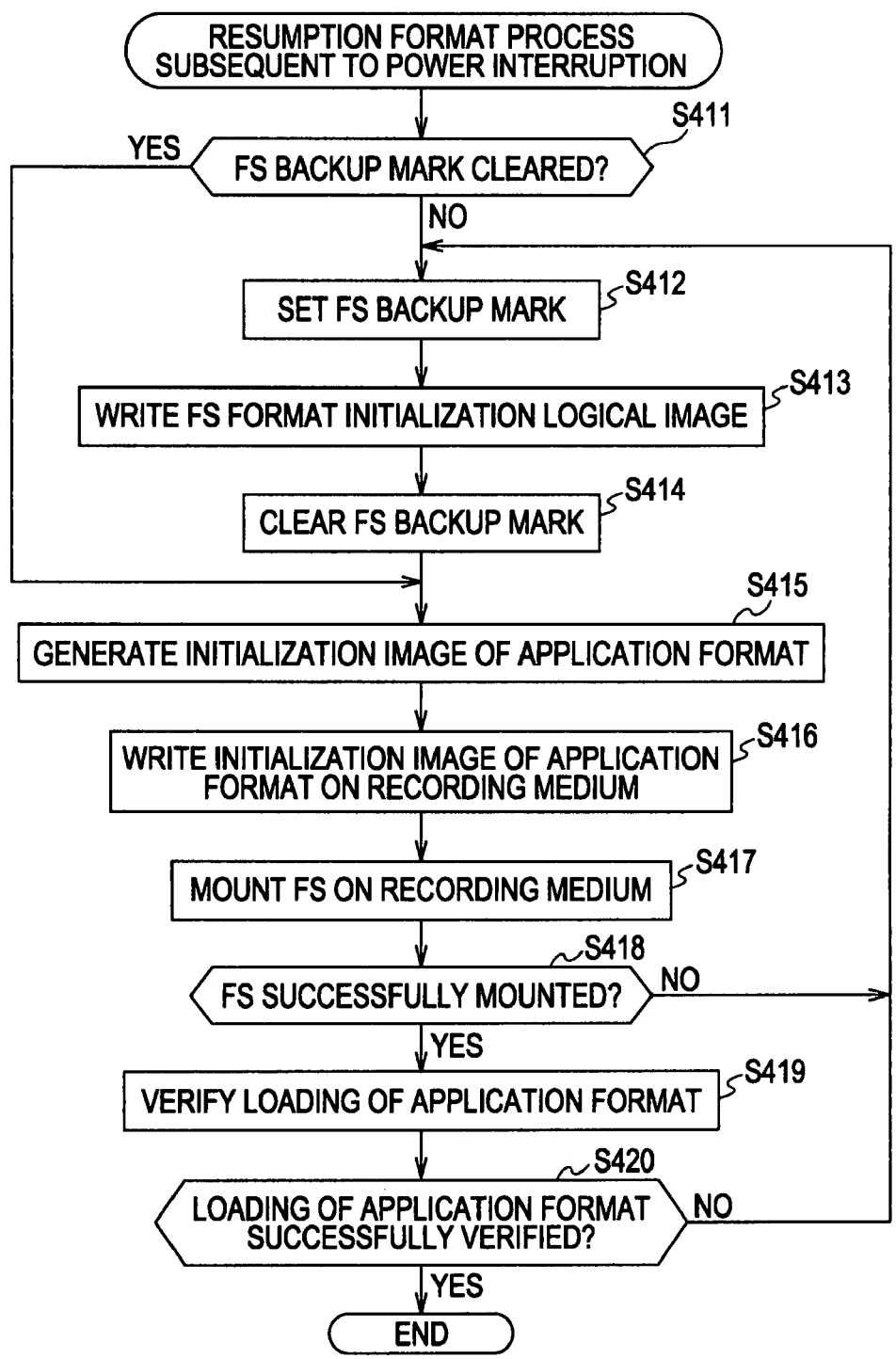
FIG. 20 is a flowchart illustrating the resumption of the formatting process subsequent to a power interruption in accordance with one embodiment of the present invention.

The process of the flowchart of FIG. 18 is the format process in normal state. FIG. 20 is a flowchart illustrating a format process that is executed subsequent to restoration of power subsequent to the power interruption taking place on the recording and reproducing apparatus 1 during the format process.

In step S411, the recording and reproducing apparatus 1 determines whether the FS backup mark has been cleared on the backup memory 19.

If it is determined in step S411 that the FS backup mark has been cleared, processing proceeds to step S412. In step S412, the recording and reproducing apparatus 1 sets the FS backup mark. In step S413, the recording and reproducing apparatus 1 writes the format initialization logical image of the FS. In step S414, the recording and reproducing apparatus 1 clears the FS backup mark. The recording and reproducing apparatus 1 then performs steps S415 through S420, identical to steps S316 through S321 of FIG. 18.

If it is determined in step S411 that the FS backup mark has been cleared, processing proceeds to step S415. The recording and reproducing apparatus 1 performs steps S415 through S420, respectively identical to steps S316 through S321 of FIG. 18.

If a power interruption takes place in the middle of writing the format initialization logical image of FS in step S314 of FIG. 18, the FS backup mark remains set on the backup memory 19. In such a case, the answer to the determination in step S411 is non-affirmative, and the format initialization logical image write process of the FS resumes.

If the FS backup mark is cleared on the backup memory 19, a power interruption is thought to have taken place subsequent to the format initialization process of the FS (FS formation initialization logical image writing process), namely, subsequent to step S315 of FIG. 18. In such a case, the answer to the determination in step S411 is affirmative, and the process resumes subsequent to the application format initialization process.

The backup mark set on the backup memory 19 is integrally used on a system (recording and reproducing apparatus 1) in the backup control of the FS in the normal recording and the original editing process.

The backup of the FS update difference information on the backup memory 19 is not required in the format process. Once the initialization starts, no returning is possible.

The recording and reproducing apparatus 1 thus generates the FS update difference information by the unit of the integer multiple of the least common multiple of the minimum recording unit of the moving image data in the application format and the minimum unit of the file system, and stores the FS update difference information on the backup memory 19 (FIG. 1) as the backup information. The recording and reproducing apparatus 1 provides, as information indicating the progress of the recording process, the backup mark 1 indicating that the file body is being recorded, and the backup mark 2 indicating the FS is being updated. If a power interruption takes place on the recording and reproducing apparatus 1, the recording and reproducing apparatus 1 efficiently uses, in the restoration process performed at power restoration, the file system, directory update information, and backup information with the application format aligned with the start timing of the file system update.

In the application format, the recording and reproducing apparatus 1 uses the backup information in the same way as in the known art, and restores the data by reading and using another package information. In the known art, if the FS itself is destroyed, there is no way to restore it. Since the recording and reproducing apparatus 1 performs the FS update difference information updating process discussed with reference to FIGS. 7 and 9, the FS, which has been destroyed by a power interruption during the FS updating, can be easily and reliably restored.

The above-referenced series of process steps may be performed using hardware, software or a combination thereof. If the process steps are performed using software, a program of the software may be installed from a recording medium onto a computer built in dedicated hardware or a general-purpose personal computer enabled to perform a variety of functions with a variety of programs installed thereon.

FIG. 21 is a block diagram illustrating a personal computer executing the above series of process steps.

As shown in FIG. 21, a central processing unit (CPU) 201 executes a variety of processes in accordance with a program stored on a read-only memory (ROM) 202 or a storage unit 208. A random-access memory (RAM) 203 stores a program to be executed by the CPU 201 and data, as necessary. The CPU 201, the ROM 202 and the RAM 203 are interconnected to each other via a bus 204.

The CPU 201 connects to an input-output interface 205 via the bus 204. The input-output interface 205 connects to an input unit 206 including a keyboard, a mouse and a microphone, and an output unit 207 including a display and a loudspeaker. The CPU 201 executes a variety of process in response to a command input via the input unit 206. The CPU 201 outputs the process results to the output unit 207.

A storage unit 208 connected to the input-output interface 205 includes a hard disk, for example, and stores the program to be executed by the CPU 201 or a variety of data. A communication unit 209 communicates with an external device via a network such as the Internet or a local area network.

The program may be acquired via the communication unit 209 and then stored on the storage unit 208.

When loaded with a removable medium 211 such as one of a magnetic disk, an optical disk, a magneto-optical disk, and a semiconductor memory, a drive 210 connected to the input-output interface 205 drives the removable medium 211 to acquire the program and data stored thereon. The acquired program and data are transferred to the storage unit 208 for storage as necessary.

As shown in FIG. 21, the program recording media storing the program to be installed onto the computer and to be executed by the computer may be the removable medium 211. The removable medium 211 may be a package medium including one of a magnetic disk (flexible disk), an optical disk (compact-disk read-only memory (CD-ROM), digital versatile disk (DVD) or the like), a magneto-optical disk, and a semiconductor memory. The program recording media also include the ROM 202 or a hard disk forming the storage unit 208, each temporarily or permanently storing the program. Storage of the program the program recording medium is performed via the communication unit 209 such as a router, a modem, using a wired or wireless communication medium such as a local area network, the Internet, and a digital broadcasting satellite.

As shown in FIG. 21, a hard disk contained in each of the removable medium 211 and the storage unit 208 is used as the recording medium storing the moving image data. By applying the present invention to the personal computer of FIG. 21, the file system on the hard disk on each of the removable medium 211 and the storage unit 208 is restored.

The process steps described in this specification is performed in the time-series order sequence as previously stated. Alternatively, the process steps may be performed in parallel or separately.

The word system in this specification refers to a logical set of a plurality of apparatuses, and is not limited to a single-housing apparatus.

The FS of file allocation table (FAT) is employed in the discussion of the embodiments of the present invention. The present invention is applicable to a file system other than FAT FS.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus for recording data in a file by first unit on a recording medium in accordance with a predetermined file system, comprising:
   recording control means for performing a recording control operation to record a predetermined file on the recording medium, the recording control operation including data recording control for recording successively the data on the recording medium by first unit and management information updating control for updating management information of the predetermined file system on the recording medium;
   generating means for successively generating difference information of the management information by second unit during the recording control operation of the recording control means, the second unit being an integer multiple of the least common multiple of the first unit and a minimum unit of the predetermined file system; and
   backup storage means for storing as backup information the difference information generated by the generating means,
   wherein the data is recorded on the recording medium in the form of a plurality of the first units, each having a fixed data size, and the difference information is recorded in a backup memory in the form of a plurality of the second units each having a fixed data size, and wherein the data and difference information are recorded at the same time.

2. The information processing apparatus according to claim 1, wherein the generating means generates a first mark indicting that the data recording control is in progress and stores the first mark on the backup storage means, and
   generates a second mark indicating that the management information updating control is in progress and stores the second mark on the backup storage means.

3. The information processing apparatus according to claim 2, wherein the recording control means identifies a timing at which the data recording control has ended in abnormal termination, based on the presence or absence of each of the first mark and the second mark on the backup storage means.

4. The information processing apparatus according to claim 3, wherein the recording control means determines that the management information updating control has ended in abnormal termination if the second mark is stored on the backup storage means, and performs management information restoration control for restoring the management information of the predetermined file system on the recording medium, using the difference information stored on the backup storage means.

5. The information processing apparatus according to claim 4, wherein the predetermined file system comprises a file allocation table (FAT) file system, and wherein the management information of the predetermined file system includes FAT1, FAT2 and a directory entry.

6. The information processing apparatus according to claim 5, wherein the recording control means concurrently restores the FAT1, the FAT2 and the directory entry in the management information restoration control.

7. The information processing apparatus according to claim 5, wherein the predetermined file system comprises a file allocation table (FAT) file system, and wherein the management information of the predetermined file system includes FAT1, FAT2 and a directory entry,
wherein the recording control means updates the FAT1, the FAT2, and the directory entry in that order in the management information updating control,
wherein as the second marks the generating means generates a second mark zero indicating that the updating of the FAT1 is in progress and stores the second mark zero on the backup storage means,
generates a second mark one indicating that the updating of the FAT2 is in progress and stores the second mark one on the backup storage means, and
generates a second mark two indicating that the updating of the directory entry is in progress and stores the second mark two on the backup storage means, and
wherein in the management information restoration control the recording control means restores the FAT1, the FAT2 and the directory entry if the second mark zero is stored on the backup storage means,
restores the FAT2 and the directory entry if the second mark one is stored on the backup storage means, and
restores the directory entry if the second mark two is stored on the backup storage means.

8. An information processing method for recording data in a file by first unit on a recording medium in accordance with a predetermined file system, comprising:
performing a recording control operation to record a predetermined file on the recording medium, the recording control operation including data recording control for recording successively the data on the recording medium by first unit and management information updating control for updating management information of the predetermined file system on the recording medium;
successively generating difference information of the management information by second unit during the recording control operation, the second unit being an integer multiple of the least common multiple of the first unit and a minimum unit of the predetermined file system; and
storing as backup information the difference information on a storage different from the recording medium,
wherein the data is recorded on the recording medium in the form of a plurality of the first units, each having a fixed data size, and the difference information is recorded in a backup memory in the form of a plurality of the second units each having a fixed data size, and wherein the data and difference information are recorded at the same time.

9. A non-transitory computer-readable medium having stored thereon a computer-readable program for causing a computer to record data in a file by first unit on a recording medium in accordance with a predetermined file system, the program comprising:
performing a recording control operation to record a predetermined file on the recording medium, the recording control operation including data recording control for recording successively the data on the recording medium by first unit and management information updating control for updating management information of the predetermined file system on the recording medium;
successively generating difference information of the management information by second unit during the recording control operation, the second unit being an integer multiple of the least common multiple of the first unit and a minimum unit of the predetermined file system; and
storing as backup information the difference information on a storage different from the recording medium,
wherein the data is recorded on the recording medium in the form of a plurality of the first units, each having a fixed data size, and the difference information is recorded in a backup memory in the form of a plurality of the second units each having a fixed data size, and wherein the data and difference information are recorded at the same time.

10. An information processing apparatus for recording data in a file by first unit on a recording medium in accordance with a predetermined file system, comprising:
a recording controller performing a recording control operation to record a predetermined file on the recording medium, the recording control operation including data recording control for recording successively the data on the recording medium by first unit and management information updating control for updating management information of the predetermined file system on the recording medium;
a generator successively generating difference information of the management information by second unit during the recording control operation of the recording controller, the second unit being an integer multiple of the least common multiple of the first unit and a minimum unit of the predetermined file system; and
a backup storage storing as backup information the difference information generated by the generator,
wherein the data is recorded on the recording medium in the form of a plurality of the first units, each having a fixed data size, and the difference information is recorded in a backup memory in the form of a plurality of the second units each having a fixed data size, and wherein the data and difference information are recorded at the same time.

* * * * *